US005530750A

United States Patent [19]
Akagiri

[11] Patent Number: 5,530,750
[45] Date of Patent: * Jun. 25, 1996

[54] APPARATUS, METHOD, AND SYSTEM FOR COMPRESSING A DIGITAL INPUT SIGNAL IN MORE THAN ONE COMPRESSION MODE

[75] Inventor: Kenzo Akagiri, Kanagawa, Japan

[73] Assignee: Sony Corporation, Tokyo, Japan

[*] Notice: The term of this patent shall not extend beyond the expiration date of Pat. No. 5,301,205.

[21] Appl. No.: 198,863

[22] Filed: Feb. 18, 1994

Related U.S. Application Data

[63] Continuation-in-part of Ser. No. 165,259, Dec. 10, 1993, and a continuation-in-part of Ser. No. 78,547, Jun. 16, 1993, and a continuation-in-part of Ser. No. 11,376, Jan. 29, 1993, Pat. No. 5,301,205.

[30] Foreign Application Priority Data

Feb. 18, 1993 [JP] Japan ................................. 5-029423

[51] Int. Cl.⁶ ........................................................ H04L 9/00
[52] U.S. Cl. ........................................ 380/4; 380/3; 380/28; 380/46; 380/49
[58] Field of Search ............................ 380/3, 4, 28, 46, 380/49

[56] References Cited

U.S. PATENT DOCUMENTS

| | | | |
|---|---|---|---|
| 4,184,049 | 1/1980 | Crochiere et al. | 179/1 SA |
| 4,455,649 | 6/1984 | Esteban et al. | 370/80 |
| 4,535,472 | 8/1985 | Tomcik | 381/31 |
| 4,748,579 | 5/1988 | Zibman et al. | 364/726 |
| 4,896,362 | 1/1990 | Veldhuis et al. | 381/30 |
| 4,912,763 | 3/1990 | Galand et al. | 381/31 |

(List continued on next page.)

FOREIGN PATENT DOCUMENTS

| | | | |
|---|---|---|---|
| 0145788A1 | 6/1985 | European Pat. Off. | H04B 12/02 |
| 0255111A2 | 2/1988 | European Pat. Off. | G11B 20/10 |
| 0409248A2 | 1/1991 | European Pat. Off. | |
| 0424016A2 | 4/1991 | European Pat. Off. | H04B 1/66 |
| 0420745A2 | 4/1991 | European Pat. Off. | H04B 1/66 |
| 0506394A2 | 9/1992 | European Pat. Off. | G10L 7/00 |
| 63-110830 | 5/1988 | Japan | H04B 14/06 |
| 5-114888 | 5/1993 | Japan | H04B 14/06 |
| 6-29934 | 2/1994 | Japan | H04B 14/06 |
| 6-149292 | 5/1994 | Japan | G10L 9/08 |

OTHER PUBLICATIONS

K. Brandenburg, et al, "ASPEC: Adaptive Spectral Perceptual Entropy Coding of High Quality Music Signals," AES, 90th Convention 1991 Feb. 19–22, Paris, pp. 1–10 and Figs. 1 and 2.

G. Davidson, et al., "Low–Complexity Transform Coder for Satellite Link Applications," AES, 89th Convention 1990 Sep. 21–25 Los Angeles, pp. 1–22.

J. D. Johnston, "Transform Coding of Audio Signals Using Perceptual Noise Criteria," IEEE Journal on Selected Areas in Communication, vol. 6, No. 2, Feb. 1988, pp. 314–323.

(List continued on next page.)

*Primary Examiner*—David C. Cain
*Attorney, Agent, or Firm*—Limbach & Limbach

[57] ABSTRACT

An apparatus, method, and system in which a compressed digital signal is derived from a digital input signal by compressing the digital input signal in a selected one of plural compression modes. The digital output signal has a different bit rate in each compression mode, but the digital input signal is received at the same bit rate in all the compression modes. In the method, spectral coefficients are derived from the digital input signal, and are grouped by frequency and by time into bands. Each band has a frequency width, and the frequency width of at least one of the bands is set according to the selected compression mode. The spectral coefficients in each band are quantized to provide quantized spectral coefficients. Finally, the quantized spectral coefficients in each band are included in the compressed digital signal, together with sub information for each band.

59 Claims, 15 Drawing Sheets

U.S. PATENT DOCUMENTS

| | | | |
|---|---|---|---|
| 4,932,062 | 6/1990 | Hamilton | 381/43 |
| 4,972,484 | 11/1990 | Theile et al. | 381/37 |
| 5,049,992 | 9/1991 | Citta et al. | 358/140 |
| 5,109,417 | 4/1992 | Fielder et al. | 381/36 |
| 5,115,240 | 5/1992 | Fujiwara et al. | 341/51 |
| 5,117,228 | 5/1992 | Fuchigami et al. | 341/200 |
| 5,134,475 | 7/1992 | Johnston et al. | 358/133 |
| 5,142,656 | 8/1992 | Fielder et al. | 381/37 |
| 5,151,941 | 9/1992 | Nishiguchi et al. | 381/46 |
| 5,157,760 | 10/1992 | Akagiri | 395/2 |
| 5,166,686 | 11/1992 | Sugiymama | 341/155 |
| 5,185,800 | 2/1993 | Mahieux | 381/29 |
| 5,222,189 | 6/1993 | Fielder | 395/2 |
| 5,285,476 | 2/1994 | Akagiri et al. | 375/25 |
| 5,301,205 | 4/1994 | Tsutsui et al. | 375/1 |

OTHER PUBLICATIONS

E. F. Schröder, et al., "High Quality Digital Audio Encoding with 3.0 Bits/Sample using Adaptive Transform Coding," AES, 80th Convention 1986 Mar. 4–7 Montreux, Switzerland, pp. 1–7.

D. Esteban, et al., "Application of Quadrature Mirror Filters to Split Band Voice Coding Schemes," 1977 IEEE International Conference on Acoustics, Speech & Signal Processing, pp. 191–195.

G. Stoll, et al., "Masking–Pattern Adapted Subband Coding: Use of the Dynamic Bit–Rate Margin," AES, 8th Conference 199 Mar. 1–4 Paris, pp. 1–33.

J. H. Rothweiler, "Polyphase Quadrature Filters–A New Subband Coding Technique," 1983 IEEE, ICASSP 83, Boston, pp. 1280–1283.

R. E. Crochiere, et al., "Digital Coding of Speech in Sub–bands," 1976 American Telephone and Telegraph Company, The Bell System Technical Journal, vol. 55, No. 8, Oct. 1976, pp. 1069–1085.

R. Zelinski, et al., "Adaptive Transform Coding of Speech Signals," IEEE Transactions on Acoustics, Speech and Signal Processing, vol. ASSP–25, No. 4, Aug. 1977, pp. 299–330.

M. A. Krasner, "The Critical Band Coder–Digital Encoding of Speech Signals Based on the Perceptual Requirements of the Auditory System," IEEE, ICASSP Proceedings 1980, pp. 327–331.

G. Theile, et al., "Low bit–rate coding of high–quality audio signals—An introduction to the MASCAM system," EBY Review/Technical, 1988 Aug., No. 230, Brussels, Belgium, pp. 158–181.

Y. Mahieux, et al., "Transform Coding of Audio Signals at 64 Kbit/s," 1990 IEEE, Globecom '90, IEEE Global Telecommunications Conference & Exhibit, pp. 0518–0522.

5,530,750

APPARATUS, METHOD, AND SYSTEM FOR COMPRESSING A DIGITAL INPUT SIGNAL IN MORE THAN ONE COMPRESSION MODE

PRIOR UNITED STATES APPLICATIONS

This application is a continuation-in-part of U.S. patent application Ser. No. 08/165,259 of Kenzo Akagiri, filed 10 Dec. 1993, is a continuation-in-part of U.S. patent application Ser. No. 08/078,547 of Kenzo Akagiri, filed 16 Jun. 1993, and is a continuation-in-part of U.S. patent application Ser. No. 08/011,376 of Kenzo Akagiri and Kyoya Tsutsui, filed 29 Jan. 1993, U.S. Pat. No. 5,301,205.

FIELD OF THE INVENTION

This invention relates to an apparatus, method, and system in which a compressed digital signal is derived from a digital input signal using more than one compression mode. The compressed digital signal has a different bit rate in each compression mode, but the digital input signal is received at the same bit rate in all compression modes.

BACKGROUND OF THE INVENTION

The inventor's assignee has proposed in, e.g., U.S. Pat. Nos. 5,243,588 and 5,244,705, and pending U.S. patent application Ser. No. 07/736,046, the disclosures of which are incorporated herein by reference, a technique for compressing a digital audio input signal and recording the resulting compressed recording signal in bursts with a predetermined number of bits of the compressed recording signal as a recording unit.

With this technique, the compressed recording signal is an adaptive differential PCM (ADPCM) audio signal, and a magneto-optical disc is used as the recording medium for recording the compressed recording signal according to the so-called CD-I (CD-Interactive) or CD-ROM XA recording signal format. The compressed recording signal is recorded in bursts on the magneto-optical disc, with, e.g., 32 sectors of the compressed recording signal plus several linking sectors as a recording unit. The linking sectors are used to accommodate the additional signal generated by interleaving the compressed recording signal in the 32 sectors.

A recording and reproducing apparatus for a magneto-optical disc may employ one of several recording and reproduction modes for the compressed recording signal. In the CD-I and CD-XA formats, recording modes A, B, and C have been defined in which an uncompressed PCM audio signal, similar to that recorded on a normal Compact Disk (CD) but with a lower sampling frequency, is compressed to provide the compressed recording signal for recording on the magneto-optical disc. Recording mode A has a sampling frequency of 37.8 kHz, and the PCM audio signal is compressed by a compression ratio of two; recording mode B has the same sampling frequency as mode A and compression ratio of four; and recording mode C has a sampling frequency of 18.9 kHz, and a compression ratio of eight. In recording mode B, for example, the PCM audio input signal is compressed by a compression ratio of four, so that the playback time of a compact disc on which a mode B recording signal is recorded is four times theft of a disc recorded according to the standard CD format (CD-DA format). Using a recording mode in which the PCM audio signal is compressed enables the size of the recording and reproducing apparatus to be reduced, because a recording or playback time comparable with that of a standard 12 cm disc can be provided by a smaller-sized disc.

The velocity of the recording track relative to the pickup head (the "recording velocity") of the smaller-sized disc on which a recording mode B compressed signal is recorded is chosen to be the same as that of a standard CD. This means that the bit rate of the compressed recording signal reproduced from the disc is four times the bit rate required by the mode B decoder. This allows the same recording unit of the compressed recording signal to be read from the disc four times, but only one of the four readings of the recording unit of the compressed recording signal is fed into the decoder.

The compressed recording signal is recorded on the disc on a spiral track. When reproducing the track, the pickup head is caused to execute a radial track jump on each complete revolution of the disc. The track jump returns the head to its original position on the track. Causing the head to execute four track jumps causes the head to read the same part of the track four times. This method of reproducing the compressed recording signal recorded on the track is advantageous, especially when used in a small-sized portable apparatus, since it enables satisfactory reproduction to be obtained even if one of the four readings of the recording unit of the compressed recording signal is capable of being accurately decoded. This method of reproducing the compressed recording signal from the disc therefore provides a strong immunity against reproduction errors caused by physical disturbances and the like.

In future, semiconductor memories are expected to be used as a medium for recording digital audio signals. To enable semiconductor memories to provide a usable playing time, it is necessary to increase the compression ratio further by using variable bit rate compression encoding, such as entropy encoding. Specifically, it is anticipated that audio signals will be recorded and/or reproduced using IC cards employing semiconductor memories. A compressed recording signal that has been compressed using a variable bit rate compression technique will be recorded on and reproduced from the IC card.

Although it is expected that, in future, with progress in semiconductor technology, the playing time provided by an IC card will increase, and the cost of the IC card will decrease, compared with the playing time and cost of a present-day IC card, the IC card, which has barely started to be supplied to the market, is at present expensive and has a short playing time. Therefore, it is thought that an IC card might be used early on by transferring to it part of the contents of another, less expensive, larger capacity, recording medium, such as a magneto-optical disc. Signal exchange and re-recording operations would be conducted between the IC card and the magneto-optical disc. Specifically, a desired one or more selections recorded on the magneto-optical disc would be copied to the IC card. The copied selections would then be replaced by other selection(s) when desired. By repeatedly exchanging the selections recorded on the IC card, a variety of selections may be played on a portable IC card player using a small number of available IC cards.

Different applications require different bandwidths and signal-to-noise ratios for recording and reproducing audio signals. For example, when an audio signal is to be recorded and reproduced with high-fidelity quality, a bandwidth extending to 15 kHz or 20 kHz and a large signal-to-noise ratio are required. To provide these characteristics using a system in which a compressed digital recording signal is recorded on a recording medium and reproduced therefrom, the compressed recording signal must have a relatively high bit rate. For example, a bit rate in the range of 256 kbps to 64 kbps per audio channel is required. On the other hand, when a digital audio signal representing speech is to be recorded and reproduced, a bandwidth extending to 5 kHz or 7 kHz is more than adequate, and a lower signal-to-noise ratio may be acceptable. Such characteristics may be provided using a bit rate in the range of 64 kbps to several kbps. Lower bit rates increase the recording time of the recording medium. Thus, to record different types of audio signals while making optimum use of the recording capacity of the recording medium, the recording/reproducing apparatus should be capable of recording and reproducing at different bit rates as economically as possible.

Conventional recording and reproducing apparatus using, for example the above-mentioned recording modes A, B, and C operate at several different sampling frequencies to provide recording modes with different bandwidths and signal-to-noise ratios. To operate at different sampling frequencies requires a complex sampling frequency signal generating circuit, and increased complexity in the LSI signal processing circuits. Moreover, when the sampling frequencies of the compression modes are different, converting a compressed signal compressed in one compression mode to another compression mode is difficult.

When a compressed recording signal recorded on a high-capacity magneto-optical disc with a high bit rate is to be converted so that it can be recorded on a low-capacity IC card using a low bit rate recording mode, the compressed recording signal must be expanded back to an uncompressed PCM signal, which must then be re-compressed using a low bit rate compression mode to provide a low bite-rate recording signal. This requires a large amount of signal processing, which economically-viable signal processing LSIs may be unable to carry out in real time.

Additionally, in the low bit rate recording modes, the reduction in the number of bits available to represent the audio signal (the main information in the compressed recording signal) can lead to a deterioration of sound quality. If the bandwidth of bands into which the spectral coefficients are grouped is made the same at all frequencies, dividing the audio frequency range of 0 Hz to 22 kHz into 32 bands will make the bandwidth of each band approximately 700 Hz. This is many times the bandwidth of the low-frequency critical bands, which is typically about 100 Hz, and is larger than the critical bandwidth over most of the audio frequency range. This mismatch between the bandwidth of these equal bandwidth bands and the bandwidth of the critical bands at low and middle frequencies significantly reduces the efficiency of the compression process. Therefore, to reduce the bit rate of the compressed recording signal, it is necessary to reduce not only the amount of main information, but also the amount of subsidiary information.

OBJECTS AND SUMMARY OF THE INVENTION

It is an object of the invention to provide a compressor apparatus, method, and compressor/expander system capable of compressing a digital input signal in one of plural compression modes in which the complication of having a sampling frequency generating circuit that generates plural sampling frequencies, and the consequent increase in the scale of the LSI, are avoided.

It is a further object of the invention to provide a compressor apparatus, compression method and compressor/expander system capable of compressing a digital input signal in a compression mode providing a compressed signal having a low bit rate for recording on a recording medium with a limited storage capacity, such as an IC card.

It is a further object of the present invention to provide a compressor apparatus, compression method, and compressor/expander system in which the compressed signal from one type of recording medium, such as a magneto-optical disc or an optical disc, may be additionally compressed using a reduced number of arithmetic and logical operations for copying to another recording medium, and in which the additionally-compressed signal may be reproduced from the other recording medium, such as an IC card, with a reduced amount of arithmetic and logical operations.

It is a yet further object of the invention to provide a compressor apparatus, compression method, and compressor/expander system in which a digital input signal is compressed to provide a compressed signal having a low bit rate, in which the deterioration of sound quality resulting from using the low bit rate is minimized.

Accordingly, the invention provides an apparatus for compressing a digital input signal in a selected one of plural compression modes to provide a compressed digital signal. The compression modes include a first compression mode and a second compression mode. The compressed digital signal has a higher bit rate in the first compression mode than in the second compression mode. The apparatus includes a deriving circuit that derives, from the digital input signal, spectral coefficients grouped by frequency and time into bands. Each band has a frequency width. The circuit includes a frequency width setting circuit that sets the frequency width of at least one of the bands according to the selected compression mode. The apparatus also includes a quantizer that receives the bands of spectral coefficients from the deriving circuit, and provides bands of quantized spectral coefficients. Finally, the apparatus includes a circuit that includes in the compressed signal the quantized spectral coefficients from the quantizer and sub information for each band.

The invention also provides a method for compressing a digital input signal in a selected one of plural compression modes to provide a compressed digital signal. The plural compression modes include a first compression mode and a second compression mode. The compressed digital signal has a higher bit rate in the first compression mode than in the second compression mode. In the method, spectral coefficients are derived from the digital input signal, and are grouped by frequency and by time into bands. Each band has a frequency width, and the frequency width of at least one of the bands is set according to the selected compression mode. The spectral coefficients in each band are quantized to provide quantized spectral coefficients. Finally, the quantized spectral coefficients in each band are included in the compressed digital signal, together with sub information for each band.

The invention further provides a digital signal processing system for compressing a digital input signal to provide a compressed digital signal and for expanding the compressed digital signal to provide a digital output signal. The system operates in a selected one of at least two different compression modes. The compressed digital signal has a higher bit rate in a first compression mode than in a second compression mode. The system comprises a compressor and an expander.

The compressor includes a circuit for deriving the compressed signal by analyzing the digital input signal into plural spectral coefficients grouped by frequency into plural bands, quantizing the spectral coefficients in each band to provide quantized spectral coefficients, and providing the quantized spectral coefficients as the compressed digital signal. The compressor also includes a circuit that sets the frequency width of at least one of the bands into which the spectral coefficients are grouped by frequency. The circuit sets the frequency width according to the selected compression mode.

The expander includes a demultiplexer that extracts the quantized spectral coefficients and the sub information from the compressed signal and a dequantizer that dequantizes the quantized spectral coefficients in each band using the sub information for the band. The frequency width of at least one of the bands is set according to the selected compression mode. Finally, in the expander, a circuit derives the digital output signal from the spectral coefficients from the dequantizer.

Finally, the invention provides a method for changing the compression mode of a compressed signal. The method derives a second compressed digital signal from a first compressed digital signal obtained by compressing a digital input signal in a first compression mode. The second compressed digital signal is compressed in a second compression mode having a bit rate that is less than the bit rate of the first compression mode. The first compressed digital signal includes plural quantized spectral coefficients grouped by frequency into bands, that are, in turn, further grouped by frequency into frequency ranges. In the method, the quantized spectral coefficients are extracted from the first compressed digital signal and are inversely quantized to provide recovered spectral coefficients. The recovered spectral coefficients in the lowest-frequency frequency range are inversely orthogonally transformed to provide a block of a lowest-frequency frequency range signal. Blocks of the lowest-frequency frequency range signal are joined together to provide super blocks, which are then orthogonally transformed to provide new spectral coefficients. The new spectral coefficients and the recovered spectral coefficients not inversely transformed in the inverse transform step are re-quantized to provide new quantized spectral coefficients. Finally, the new quantized spectral coefficients are included in the second compressed digital signal.

When the compression mode is changed from one with a high bit rate to one with a lower bit rate in the compressor, system, and method according to the present invention, the frequency width of the bands into which the spectral coefficients are grouped is increased, preferably by an integral number of times. Additionally, when the compression mode is changed from one with a high bit rate mode to one with a low bit rate, the upper frequency limit of the digital input signal is reduced.

When the digital input signal represents an audio signal, and the frequency width of the bands is set for the purpose of determining quantizing noise and masking, the frequency width of the bands increases with increasing frequency. Moreover, quantizing bits are not allocated to spectral coefficients in bands above the upper frequency limit of the compression mode, and no sub information for such bands is included in the compressed signal.

In the apparatus, system, and methods according to the invention, the digital input signal is received at the same sampling frequency in all the compression modes.

The spectral coefficients may be derived from the digital input signal by applying an orthogonal transform to the digital input signal. The orthogonal transform may be performed by dividing the digital input signal into a frequency range signal in each of plural frequency ranges, dividing each frequency range signal in time into blocks, and orthogonally transforming each block of each frequency range signal. The lowest two frequency ranges preferably have an equal bandwidth. The bandwidth of the frequency ranges above the lowest frequency range preferably increases with increasing frequency. The maximum length of the blocks into which the frequency range signals are divided is preferably increased when the compression mode is changed from one having a high bit rate to one having a low bit rate. However, the maximum length of the blocks into which the frequency range signals in the higher frequency ranges are divided may be kept the same in all the compression modes.

The method according to the invention may include the additional step of recording the compressed signal on a recording medium. The recording medium may be any one of a magneto-optical disc, a semiconductor recording medium, an IC memory card, an optical disc, or some other recording medium.

In the apparatus, system, and methods according to the present invention, a modified DCT may be employed as the orthogonal transform.

The apparatus, system, and methods according to the invention may additionally compress a compressed signal compressed in one compression mode to provide a compressed signal compressed in another compression mode with a lower bit rate. In this, the spectral components in at least the lowest frequency range in the compressed signal may be subject to an inverse orthogonal transform, and the resulting restored frequency range signal may then be orthogonally re-transformed with an increased maximum block length to provide the main information of the additionally-compressed signal.

In the apparatus, systems, and methods according to the present invention, the digital input signal has the same sampling frequency in all the compression modes, despite the different output bit rates of the different modes. This avoids the complication inherent in a sampling frequency generating circuit that is required to provide multiple sampling frequencies, and the complication of processing circuitry operating at multiple sampling frequencies. The apparatus and method according to the present invention enables a compressed signal compressed in one compression mode to be easily convened into a compressed signal compressed in another compression mode. This has hitherto been difficult to do because of the use of different sampling frequencies.

If it is desired to copy a compressed signal compressed in a compression mode with a high bit rate from a high-capacity recording such as a magneto-optical disc to a small capacity recording medium, such as an IC card, and to further compress the compressed signal to reduce the bit rate of the signal recorded on the IC card, the additional compression may be achieved using only additional processing. It is not necessary to expand the compressed signal fully, and to re-compress the expanded signal from scratch in the new compression mode.

Because of the reduced upper frequency limit of the compressed signal in the compression modes with lower bit rates, it is unnecessary to perform arithmetic and logical operations on the bands above the upper frequency limit. This provides a reduction in the number of arithmetic and logical operations, and allows the processing circuitry to be simplified. Alternatively, the unused processing capacity may be used to perform additional processing to improve the sound quality in the compression modes with low bit rates. Moreover, if an entire higher frequency range is not required, the frequency range may be eliminated in its entirety. If part of the frequency range is required, processing may be performed only in the part of the frequency range that is actually used, and processing in the unused part of the frequency range may be eliminated.

The proportional decrease in the number of bits available for representing the main information of the compressed signal is greater than the proportional decrease in the bit rate between the compression modes. Additional measures are therefore desirable to prevent an unacceptable degradation of the sound quality when a compression mode with a lower bit rate is used. According to the present invention, the compression efficiency is improved by increasing the frame length, and hence by increasing the maximum block length subject to the orthogonal transform. By increasing the maximum block length, the signal may be orthogonally transformed from the time domain to the frequency domain with acceptable accuracy while the amount the amount of sub information, such as scale factors and the word length data, is reduced. Reducing the amount of sub information increases the number of bits available for representing the main information.

Additionally, towards higher frequencies, the method and apparatus according to the invention broaden the frequency width of at least a majority of the bands into which the spectral coefficients resulting from the orthogonal transform are divided by frequency for the purpose of determining quantizing noise and masking. Towards lower frequencies, the method and apparatus according to the invention perform the orthogonal transform and the grouping into bands in a way that results in bands that correspond closely to critical bands, despite the reduction in the upper frequency limit in the low bit rate compression modes. These measures make it possible to prevent the compression efficiency from being lowered, as occurs with a conventional arrangement of bands having equal widths across the entire frequency range.

When the upper frequency limit is reduced, if the width of the bands into which the spectral coefficients are divided for the purpose of determining quantizing noise and masking remains constant with frequency, dividing the frequency range of 0 Hz to 22 kHz into 32 bands results in bands that are about 700 Hz wide. This is substantially wider than the critical bandwidth at low frequencies (typically about 100 Hz), and is wider than the critical bandwidth over most of the frequency range. This impairs the compression efficiency.

According to the present invention, the width of the bands into which the spectral coefficients are divided for the purpose of determining quantizing noise and masking is selected to be broader towards higher frequencies, and to be similar to the critical bandwidth for at least a majority of the bands. Additionally, to prevent the sound quality from being degraded in the compression modes with lower bit rates, the maximum block length subject to the orthogonal transform is increased in the compression modes with lower bit rates.

If the compressed signal recorded on a magneto-optical disc, as a first recording medium, is to be copied to a second recording medium, such as an IC card, the amount of arithmetic and logical operations may be reduced by directly copying the signal from one recording medium to the other, or by additionally compressing the compressed signal reproduced from the first recording medium before recording it on the second recording medium, without fully expanding the reproduced signal.

The number of arithmetic and logical operations in the copying process may be reduced by applying an inverse orthogonal transform to the spectral coefficients in limited portion of the frequency range, i.e., to the spectral coefficients in the low frequency range. The resulting restored frequency range signal is then orthogonally transformed with a longer maximum block length to provide spectral coefficients for the additionally-compressed signal. For the frequency ranges in which the spectral coefficients are not re-transformed, the frequency widths of the bands into which the spectral coefficients are grouped by frequency, and for which sub information is included in the compressed signal, are increased to reduced the amount of sub information in the compressed signal. This allows more bits to be used for quantizing the spectral coefficients, and reduces the impairment of sound quality resulting from using a compression mode with a low bit rate.

BRIEF DESCRIPTION OF THE DRAWINGS

FIG. 15 shows how a frame of 11.6 ms is divided in frequency and in time into 52 bands in consideration of the bandwidths of the critical bands and the efficiency of the block floating processing applied to the bands.

FIG. 19 is a block diagram showing a decoder for expanding a compressed signal generated by an encoder according to the invention.

DETAILED DESCRIPTION OF THE INVENTION

A preferred embodiment of the present invention will now be described with reference to the accompanying drawings.

1. OVERVIEW OF THE RECORDING/REPRODUCING APPARATUS

Figure 1:
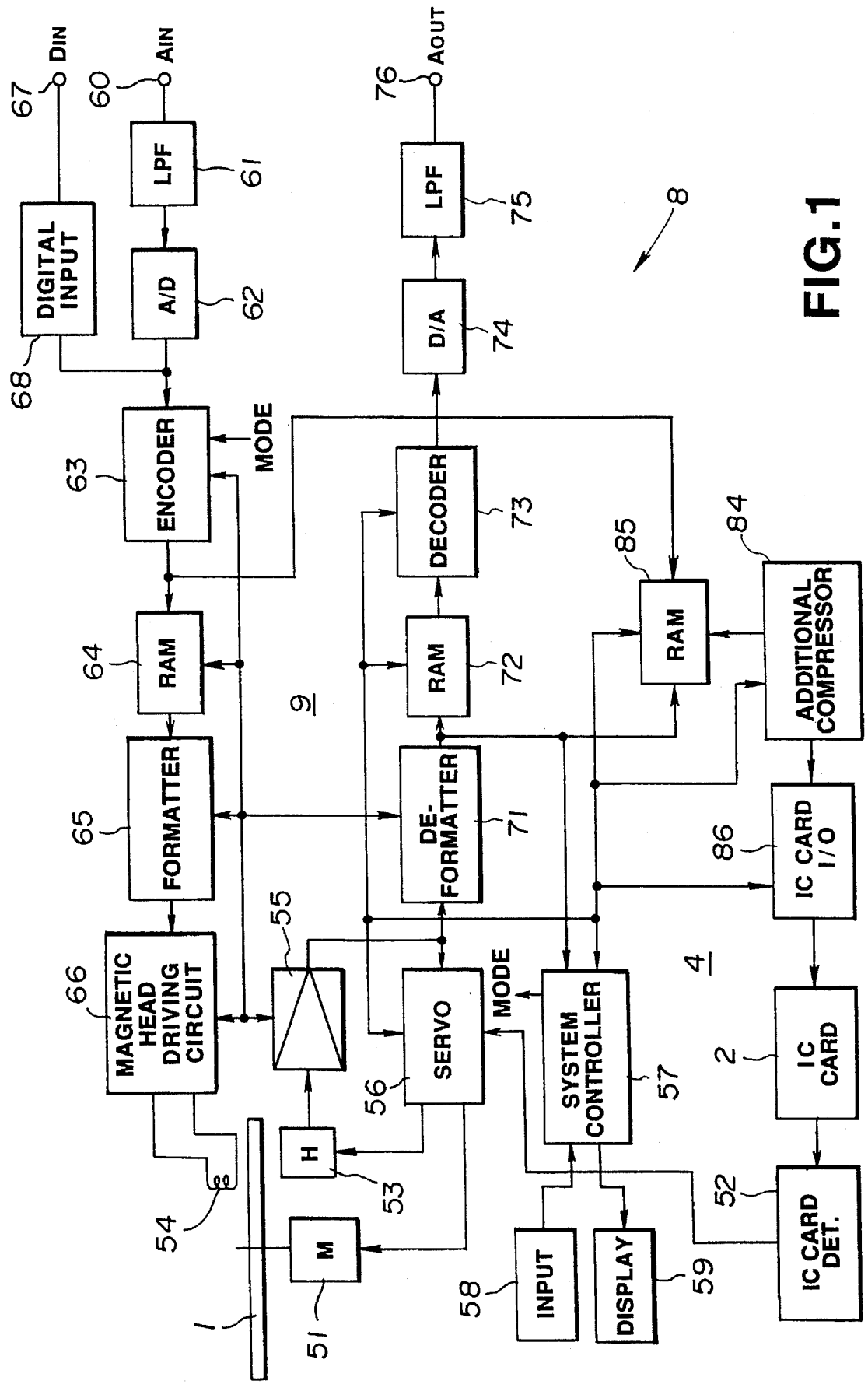
FIG. 1 is a block diagram of a practical example of a recording and reproducing apparatus for a compressed recording signal and including an encoder according to the present invention.

FIG. 1 shows the schematic arrangement of an embodiment of an apparatus 8 for recording and reproducing a compressed recording signal. The apparatus includes an encoder according to the invention for compressing the digital input signal.

The apparatus 8 shown in FIG. 1 comprises the recording and reproducing system 9 for a first recording medium, such as the magneto-optical disc 1, and the recording and reproducing system 4 for a second recording medium, such as the IC card 2. When the compressed recording signal recorded on the magneto-optical disc 1 is copied to the IC card 2, the deformatter 71 processes the compressed recording signal read out from the magneto-optical disc 1 by the optical head 53. The deformatter 71 applies eight-to-fourteen modulation (EFM) demodulation and de-interleaving or error correction to the compressed recording signal read out from the magneto-optical disc 1. The compressed recording signal from the deformatter 71 is written into the memory 85 of the IC card recording and reproducing system 4, where it is processed by the additional compressor 84. The additional compressor additionally compresses the compressed recording signal stored in the memory 85 using variable bit-rate coding, for example, entropy coding. The resulting additionally-compressed signal is recorded on the IC card 2 by the IC card interface 86.

In the copying process just described, the compressed recording signal reproduced from the magneto-optical disc 1 is fed into the IC card recording and reproduction system 4 in a compressed state, that is, the reproduced compressed recording signal is not expanded by the decoder 73. The unexpanded compressed recording signal is then additionally compressed before being recorded on the IC card 2.

The recording and reproducing apparatus 8 has two operating modes for reproducing the compressed recording signal recorded on first recording medium, e.g., the magneto-optical disc 1: a normal mode and a high-speed copy mode. In the normal reproduction mode, the compressed recording signal is reproduced from the magneto-optical disc intermittently or in bursts. The compressed recording signal is formatted in recording units that contain a predetermined number of bits. For example, a recording unit can consist of a cluster including 32 sectors of the compressed recording signal, together with several additional sectors to accommodate the additional signal resulting from interleaving the compressed recording signal in the 32 sectors. The reproduced compressed recording signal is then expanded and converted to provide at least one audio output signal.

In the high-speed copy mode, the compressed recording signal is copied at high speed from the first recording medium to the second recording medium, the IC card 2 in the example shown. The compressed recording signal recorded on the first recording medium is read out continuously, is continuously additionally compressed, and is continuously fed to the second recording medium, where it is continuously recorded. This results in high-speed or short-duration copying. The increase in copying speed is at least equal to the compression ratio of the compressed recording signal recorded on the first recording medium.

2. RECORDING & REPRODUCING APPARATUS DESCRIPTION (a) The Magneto-Optical Disc Mechanism The recording and reproducing apparatus 8 shown in FIG. 1 will now be described in detail. In the magneto-optical disc recording and reproducing system 9 of the recording and reproducing apparatus, the recording medium is the magneto-optical disc 1, which is rotationally driven by the spindle motor 51.

The compressed recording signal is recorded along the recording track pre-formed on the magneto-optical disc 1 using magnetic field modulation recording. In this, a magnetic field, modulated in accordance with the compressed recording signal, is applied to one side of the magneto-optical disc 1 by the magnetic head 54, driven by the magnetic head driver circuit 66, and laser light is radiated onto the other side of the disc 1 by the optical head 53. The magnetic field and the laser light together perform thermo-magnetic recording.

The compressed recording signal is reproduced from the magneto-optical disc 1 by tracing the recording track using laser light from the optical head 53 to reproduce the recorded signal photomagnetically.

The optical head 53 includes a laser light source, such as a laser diode; optical components, such as a collimator lens, object lens, polarization beam splitter, and a cylindrical lens; and a photodetector having a light receiving section of a predetermined pattern. The optical head 53 is located facing the magnetic head 54 on the opposite side of the magneto-optical disc 1.

The optical head 53 also detects the laser light reflected from the recording track at the point at which the compressed recording signal is written or read to enable the optical head to detect focusing errors and tracking errors. When reproducing the compressed recording signal from the magneto-optical disc 1, the optical head 53 detects focusing errors using the, so-called astigmatic method and detects tracking errors using the so-called push-pull method.

The optical head 53 also detects variations in the polarization angle (Kerr rotation angle) of the laser light reflected from the recording track and from this generates a playback signal. The playback signal from the optical head 53 is fed into the RF circuit 55, which extracts the focusing and tracking signals from the output of the optical head 53 and supplies them to the servo control circuit 56. The RF circuit also converts the output of the optical head into binary signals, which it supplies to the deformatter 71, which will be described in detail below.

The servo control circuit 56 consists of, for example, a focusing servo control circuit, a tracking servo control circuit, a spindle motor servo control circuit and a head feed servo control circuit. The focusing servo control circuit controls the optical system of the optical head 53 to reduce the focusing error signal to zero. The tracking servo control circuit also controls the optical system of the optical head to reduce the tracking error signal to zero. The spindle motor servo control circuit controls the spindle motor 51 to rotate the magneto-optical disc 1 to establish a constant linear velocity between the recording track and the optical head. The head feed servo control circuit causes the optical head 53 and the magnetic head 54 to be moved radially relative to the magneto-optical disc 1 to the point on the recording track designated by the system controller 57.

The servo control circuit 56, while performing the above-mentioned control operations, transmits information indicating the operating status of the various parts controlled by it to other parts of the circuit, such as to the system controller 57, which will be described below.

(b) System Controller

The control key input 58 and the display 59 are connected to the system controller 57. The system controller controls the recording and reproducing system according to the operating mode selected by input information entered by the user at the control key input 58. The system controller 57 also controls the positions of the optical head 53 and the magnetic head 54 on the recording track in both record and playback, in response to sector-by-sector address information, including header time or subcode Q data, reproduced from the recording track of the magneto-optical disc 1.

The system controller 57 also causes compression mode information to be displayed on the display 59. In record, the compression mode information is supplied by the encoder 63 in response to the setting of a compression mode control key (not shown) in the control key input 58. In playback, the compression mode information is supplied by the reproducing system, which extracts the compression mode information from the compressed recording signal reproduced from the magneto-optical disc 1, as will be described below.

Finally, the system controller 57 displays the playback time on the display 59. The playback time is derived by multiplying sector-by-sector address information (absolute time information), such as header time or sub-code Q data, reproduced from the recording track of the magneto-optical disc 1, by the compression ratio of the designated compression mode to provide the real playback time. For example, if the compression ratio is four, the absolute time read off the magneto-optical disc is multiplied by four to give the real playback time. If absolute time information is preformatted on the recording track of the magneto-optical disc in the course of making the disc, the preformatted absolute time information may be read and multiplied by the compression ratio to display the real playback time of the current position of reproduction.

(c) Magneto-Optical Disc Recording System

In the recording system of the recording and reproducing system 9 of the recording and reproducing apparatus 8, the analog audio input signal $A_{IN}$ is supplied from the input terminal 60 to the analog-to-digital (A/D) converter 62 via the low-pass filter 61. The A/D converter converts the analog audio input signal $A_{IN}$ to a PCM digital audio input signal. The digital audio input signal from the A/D converter is supplied to the encoder 63. A PCM digital audio input signal $D_{IN}$ from the input terminal 67 may alternatively be supplied via the digital input interface circuit 68 to the encoder 63.

The encoder 63 receives the digital audio input signal at the system sampling rate and compresses it according to the one of the compression modes shown in Table 1 designated by the system controller 57. For example, if the designated compression mode is compression mode B, the encoder receives the digital input signal at a sampling rate of 44.1 kHz, and feeds a compressed signal into the memory 64 with a bit rate of 64 kb/s. The encoder reduces the bit rate of the standard CD-DA format of by a factor of eight, i.e., from 75 sectors/second to 9.375 sectors/second.

TABLE 1

| (Sampling Frequency = 44.1 kHz) | | | |
|---|---|---|---|
| COMPRES-SION MODE | BIT RATE kbps/channel | BAND-WIDTH kHz | FRAME LENGTH msec |
| A | 128 | 22 | 11.6 |
| B | 64 | 13 | 23.2 |
| C | 32 | 5.5 | 34.8 |
| D | 16 | 3 | 46.4 |

In the embodiment shown in FIG. 1, the sampling frequency of the A/D converter 62 is the same as the sampling frequency of the standard CD-DA format, i.e., 44.1 kHz, and the encoder 63 operates at this sampling frequency in all compression modes. However, since the bandwidth of the compressed recording signal is reduced in the lower bit rate compression modes, the cut-off frequency of the low-pass filter 61 must be set according to the selected compression mode.

The system controller 57 controls writing the compressed signal into and reading the compressed recording signal out of the buffer memory 64. The buffer memory 64 temporarily stores the compressed signal from the encoder 63 in readiness for recording it on the disc. In compression mode B, the compressed signal from the encoder 63 has a transfer rate that is one eighth of the transfer rate of 75 sectors/second of the standard CD-DA format, i.e. 9.375 sectors/second.

The compressed signal is continuously written into the buffer memory 64. Although it is possible for the compressed recording signal to be read out of the buffer memory 64 and to be recorded into one of every eight sectors on the disc, as described above, it is preferred to record the compressed recording signal quasi-continuously into plural sectors on the disc, as will be described below, because recording into one of every eight sectors is infeasible.

To record the compressed recording signal in a quasi-continuous manner, recording is performed in a burst with an instantaneous transfer rate of 75 sectors/second, after a waiting period in which no recording takes place. The transfer rate is the same transfer rate as that of the standard CD-DA format. Recording is performed in a recording unit of a cluster of a predetermined number of sectors. Preferably, each cluster includes 32 sectors, plus several additional sectors to accommodate the additional amount of signal that results from interleaving the compressed recording signal in the 32 sectors.

Under control of the system controller 57, the compressed signal is written continuously into the buffer memory 64 at the transfer rate of 9.375 (75/8) sectors/second of compression mode B. Also under control of the system controller, the compressed recording signal is read out from the buffer memory 64 in bursts with an instantaneous transfer rate of 75 sectors/second. The overall transfer rate for the compressed recording signal read out from the buffer memory 63 and recorded on the magneto-optical disc 1, including the non-recording period, is the low rate of 9.375 sectors/second. However, the instantaneous transfer rate during the recording process is the standard rate of 75 sectors/second. This way, if the recording velocity of the magneto-optical disc 1 is the same as that of the standard CD-DA format, the recording on the magneto-optical disc 1 has the same recording density and the same recording pattern as a conventional CD-DA format recording.

The compressed recording signal read out from the memory 64 in bursts at an instantaneous transfer rate of 75 sectors/second is supplied to the formatter 65. In the formatter, the compressed recording signal is formed into recording units of clusters consisting of plural sectors, preferably, 32 sectors, together with several cluster-linking sectors arrayed before and after the plural sectors. The number of cluster-linking sectors is set so that the cluster-linking sectors can accommodate the additional signal that results from interleaving the compressed recording signal in the plural sectors. This way, each cluster accommodates a self-contained portion of the compressed recording signal that is unaffected by the interleaving of the portions of the compressed recording signal in adjoining clusters.

The formatter 65 additionally processes the compressed recording signal read out in bursts from the buffer memory 64 by subjecting it to encoding for error correction, such as parity appending and interleaving, and by subjecting it to eight-to-fourteen (EFM) encoding. The compressed recording signal from formatter 65 is fed into the magnetic head driving circuit 66. The magnetic head driving circuit is connected to the magnetic head 54 and causes the magnetic head to apply a magnetic field, modulated in accordance with the compressed recording signal, to the magneto-optical disc 1.

The system controller 57 controls the position of the optical head 53 and the magnetic head 54 on the recording track of the magneto-optical disc 1 so that the compressed recording signal read out from the buffer memory 64 in bursts is recorded on the recording track of the magneto-optical disc. The system controller also supplies a control signal designating the recording position on the recording track of the magneto-optical disc to the servo control circuit 56.

(d) Magneto-Optical Disc Reproducing System

The reproducing system of the magneto-optical disc recording and reproducing system 9 will now be described.

The reproducing system reproduces the compressed recording signal quasi-continuously recorded on the recording track of the magneto-optical disc 1 by the above-mentioned recording system. The optical head 53 illuminates the disc 1 with laser light and generates a playback signal in response to light reflected from the disc. The playback signal is fed into the RF circuit 55 where it is converted into a binary playback signal, which is fed into the deformatter 71. The reproducing system is capable of reproducing a conventional compact disc (CD-DA), in addition to the magneto-optical disc 1.

The deformatter 71 is the counterpart of the formatter 65 in the recording system described above. The deformatter processes the binary playback signal from the RF circuit 55 by applying EFM decoding, error correction, and de-interleaving to provide the compressed recording signal in the selected compression mode with a transfer rate of 75 sectors/second. This is faster than the transfer rate of the selected compression mode.

Under control of the system controller 57, the compressed recording signal from the de-formatter 71 is repetitively written into the buffer memory 72 at a transfer rate of 75 sectors/second, and is continuously read out from the buffer memory once at the transfer rate of 9.375 sectors/second, corresponding to the transfer rate of the selected compression mode B.

The system controller 57 controls the position of the optical head 53 on the recording track of the magneto-optical disc 1 to cause the compressed recording signal to be repetitively reproduced from the recording track of the disc 1 for repetitive writing into the memory 72. The system controller also supplies a control signal designating the playback position on the recording track of the magneto-optical disc to the servo control circuit 56.

The compressed signal is transferred continuously from the memory 72, to the decoder 73 at the transfer rate of 9.375 sectors/second of compression mode B. The decoder 73 performs decoding complementary to the encoding performed by the encoder 63 in the recording system. The operating mode of the decoder 73 is designated by the system controller 57. The decoder 73 expands the compressed signal by a factor of eight to provide the digital audio output signal, a 16-bit PCM signal. The digital audio output signal is fed from the decoder 73 to the digital-to-analog (D/A) converter 74.

The D/A converter 74 converts the digital audio output signal from the decoder 73 into the analog audio output signal $A_{OUT}$, which passes via the low-pass filter 75 to the analog audio output terminal 76. The digital audio output signal may also be fed to a digital audio output terminal (not shown).

(e) IC Card Recording System

The digital audio input signal, obtained by converting the analog audio input signal $A_{IN}$ supplied from the input terminal 60 via the low-pass filter 61 in the A/D converter 62, or fed in directly through the digital input 67, is compressed by the encoder 63 to provide the compressed signal. The compressed signal is additionally compressed by the additional compressor 84 for recording on the IC card 2. The additional compressor 84 may be a type of variable bit rate encoder, and may implement so-called entropy encoding. The compressed signal from the encoder 63 is fed to the additional compressor 84 via the buffer memory 85. The compressed signal is read out of the buffer memory 85 to the additional compressor 84, which performs variable bit rate encoding, such as entropy encoding. The resulting additionally-compressed signal is recorded with a variable bit rate in the IC card 2 via the IC card interface circuit 86.

It is also possible to use a compressor according to the present invention for the additional compressor 84, instead of an encoder that performs entropy encoding. The compressor according to the present invention provides a signal for recording on the IC card 2 at a constant, low bit rate by increasing the size of the orthogonal transform, or by increasing the width of the bands in the frequency domain to which block floating is applied.

(f) High-Speed Copying

The IC card recording and reproducing system 4 can not only record an analog or a digital input signal fed into the analog input terminal 60 or the digital input terminal 67, respectively, but can also record the compressed recording signal copied from the magneto-optical disc 1 at high speed. In the latter case, the signal reproduced from the magneto-optical disc 1 is fed directly, without being fully expanded, into the buffer memory 85 in the IC card recording and reproducing system 4.

The system controller 57, in response to the high-speed copy key of the control key input 58, prepares the apparatus in readiness for entering into the high-speed copy mode. When the IC card 2 is inserted into the IC card recording unit 4, the IC card detection circuit 52 sends a signal to the system controller 57 via the servo 56. When the IC card detection circuit 52 detects that the IC card 2 has been inserted into the recording unit 4, the system controller sets the apparatus into the high-speed copy mode.

In response to the system controller 57, the servo 56 causes the compressed recording signal recorded on the magneto-optical disc 1 to be reproduced continuously (i.e., no track jumps are performed). The resulting reproduced compressed recording signal from the deformatter 71 is supplied directly, i.e., without expansion, to the buffer memory 85 in the IC card recording and reproducing system 4. The compressed signal is processed by the additional compressor 84 with variable bit rate coding, and is then recorded on the IC card 2 via the IC card interface circuit 86. If the compressed recording signal recorded on the magneto-optical disc 1 is compressed in accordance with compression mode B, the transfer rate of the compressed recording signal reproduced from the magneto-optical disc, and hence the transfer rate of the compressed signal from the deformatter 71, is eight times the normal transfer rate.

Thus, during high-speed copying, the mode B compressed recording signal recorded on the magneto-optical disk 1 is continuously reproduced from the magneto-optical disc, and is copied at eight times the normal rate to the IC card 2, after variable length encoding. Thus, selections recorded on the magneto-optical disc 1 can be copied to the IC card 2 in one-eighth of real time. As stated above, the additional compressor 84 may alternatively compress the compressed signal using a lower, fixed bit rate, instead of a variable bit rate.

The speed ratio of the copying process depends on the compression mode of the compressed recording signal recorded on the magneto-optical disc 1. However, if the magneto-optical disc is rotationally driven to provide a recording velocity that is a multiple of the normal recording veltocity, copying may be performed at a speed ratio greater than the speed ratio that results from the compression of the compressed recording signal recorded on the magneto optical disc 1.

Figure 2:
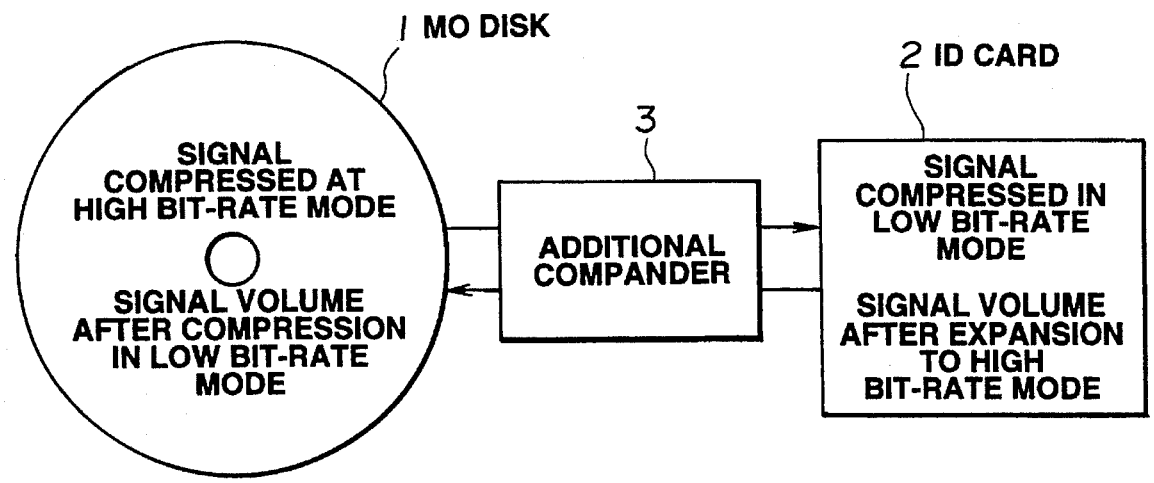
FIG. 2 illustrates the contents recorded in a magneto-optical disc and an IC card.

Referring to FIG. 2, the compressed recording signal having a constant bit rate is recorded on the magneto-optical disc 1 together with signal volume information indicating the number of bits in the additionally-compressed signal resulting when the additional compander 3 additionally compresses the compressed signal. As mentioned above, the additionally-compressed signal may have a variable bit rate, or a low, fixed bit rate. The signal volume information indicates the number of bits in the additionally-compressed recording signal to be recorded on the IC card 2, and indicates the recording capacity required on the IC card 2 to record the additionally-compressed recording signal. By providing signal volume information for each selection on the magneto-optical disc 1, the number of selections recorded on the magneto-optical disc 1 which may be accommodated by the IC card 2, or the combination of these selections, can be known instantly by reading out the signal volume information from the magneto-optical disc.

Additionally, if, in addition to the additionally-compressed recording signal, second signal volume information that indicates the number of bits in the compressed signal, prior to the additional compression, is recorded on the IC card 2, the capacity of the magneto-optical disc 1 required when selections are copied from the IC card 2 back to the magneto-optical disc may also be known instantly.

(g) View of the Apparatus

Figure 3:
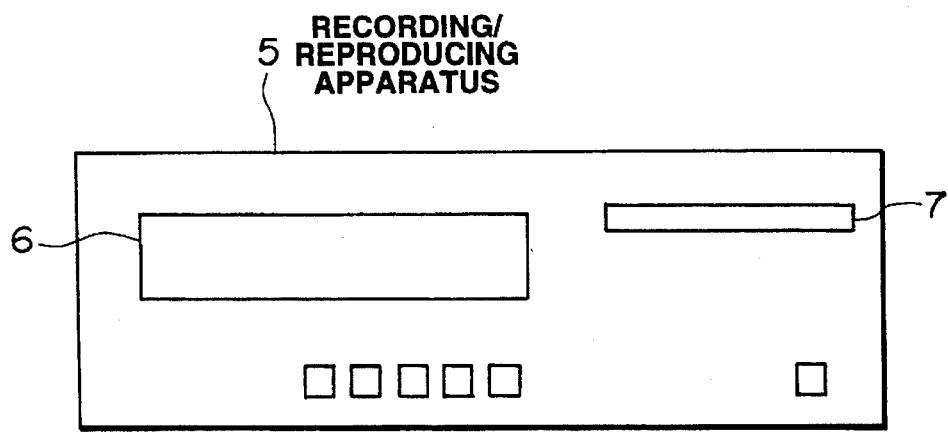
FIG. 3 shows an example of the appearance of the front panel of the recording and reproducing apparatus.

FIG. 3 shows a from view of the recording and reproducing apparatus 5, the circuit of which is shown in FIG. 1. The apparatus includes the magneto-optical disc inserting section 6 and the IC card inserting slot 7. Alternatively, the magneto-optical recording and reproducing system 9 (FIG. 1) and the IC card recording and reproducing system 4 (FIG. 1) may be independent units, with the required signals being transmitted between them using suitable links, such as electrical or optical cables, or RF or optical transmission and reception.

3. SIGNAL COMPRESSION

The techniques for compressing the digital input signal, such as a PCM audio input signal, using the techniques of sub-band coding (SBC), adaptive transform coding (ATC) and adaptive bit allocation (APC-AB) used in the encoder 63 in FIG. 1, and the corresponding expansion techniques used in the decoder 73 will now be described with reference to FIG. 4 and following Figures.

(a) Overview

Figure 4:
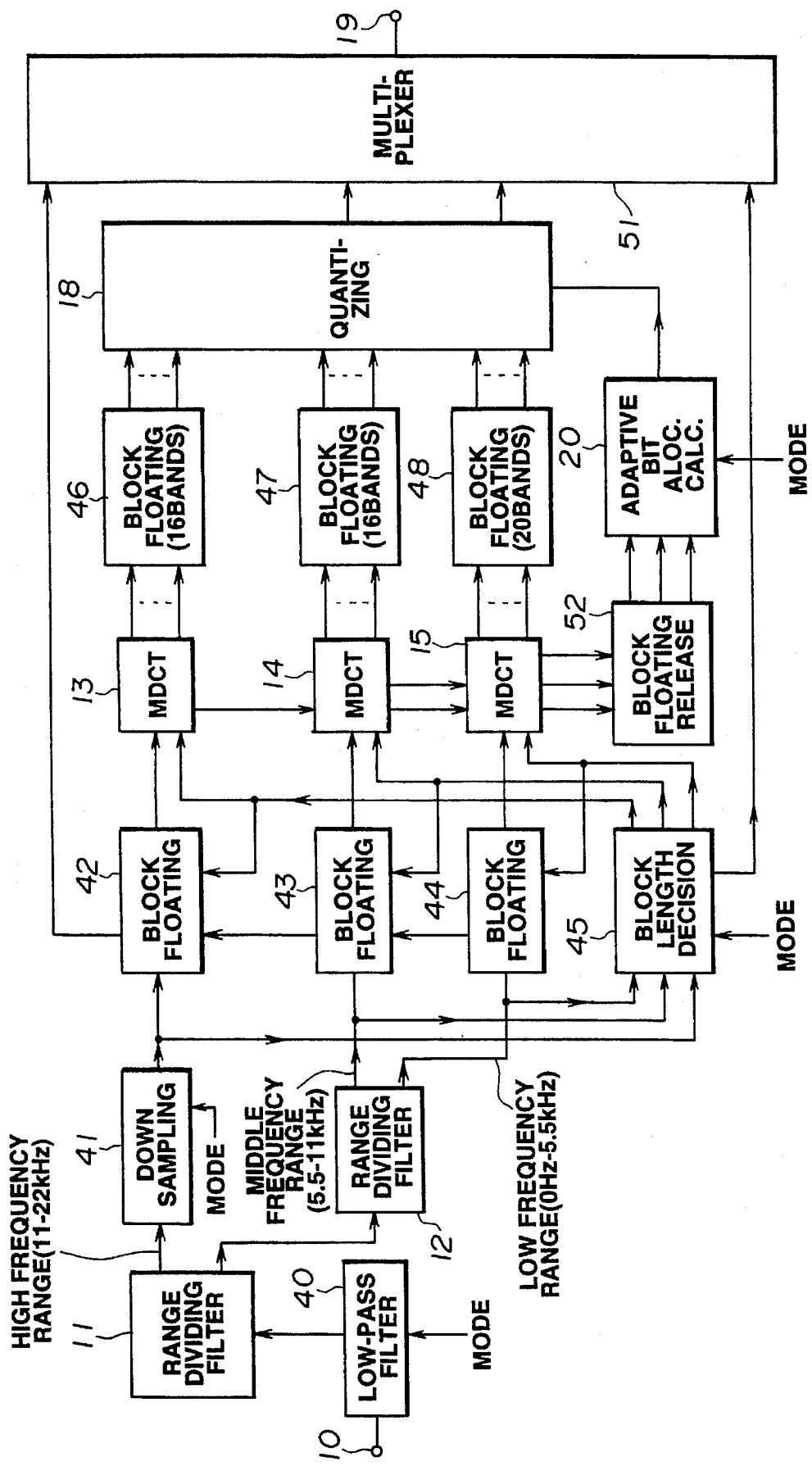
FIG. 4 is a block diagram showing a practical example of the encoder according to the invention for compressing a digital audio input signal.
Figure 5A:
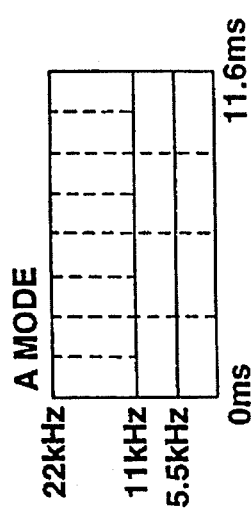
FIGS. 5A through 5D show the frame and block structure in which the frequency range signals derived from the digital audio input signal are processed in four different compression modes.
Figure 5B:
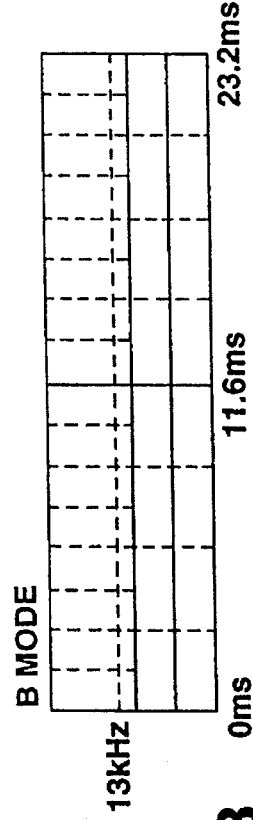
Figure 5C:
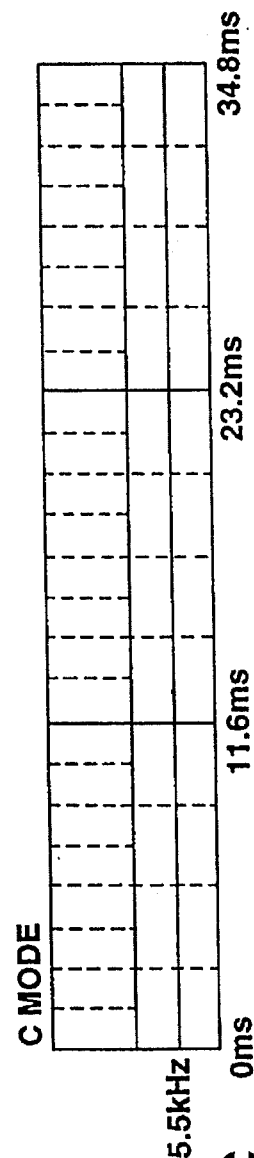
Figure 5D:
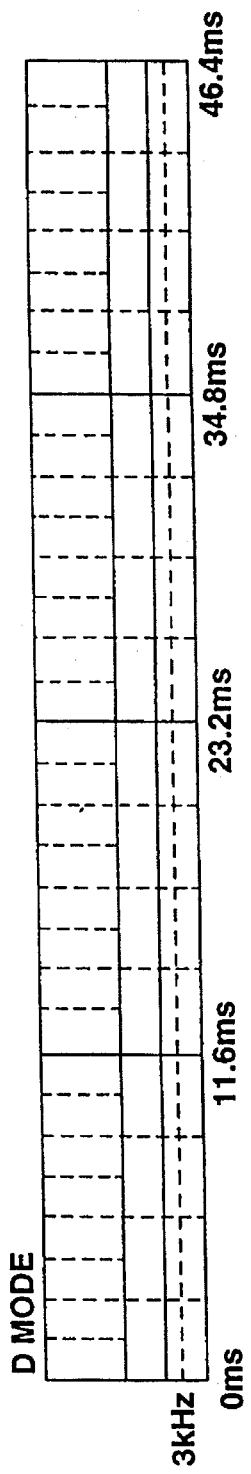

In the encoder shown in FIG. 4, frequency range dividing filters divide the digital input signal in frequency into a frequency range signal in each of plural frequency ranges such that the bandwidths of the frequency ranges increase with increasing frequency, and the bandwidths of the two lower frequency ranges are the same. The frequency range signal in each frequency range is divided in time into blocks, and each block of each frequency range signal is orthogonally transformed to provide plural spectral coefficients in the frequency domain. The spectral coefficients are grouped by frequency into bands, and adaptive bit allocation is carried out to allocate the total number of available quantizing bits among the bands. The spectral coefficients in each band are quantized using the number of quantizing bits allocated to the band.

Each band of spectral coefficients represents a segment of the digital input signal obtained by dividing the digital input signal by time and frequency. The time division is provided by the division of the input signal in time into blocks, the frequency division is obtained by the frequency grouping of the spectral coefficients resulting from orthogonally transforming one of the blocks.

Spectral coefficients grouped by frequency into bands may alternatively be obtained by using a serial and parallel arrangement of multiple filters, such as QMF filters, to divide the digital input signal in frequency into a frequency band signal in each of multiple narrow frequency bands. Each frequency band signal is then divided in time to provide a band of spectral coefficients. Again, each band of spectral coefficients represents a segment of the digital input signal obtained by dividing the digital input signal by time and frequency. The frequency division is provided by the division of the input signal by frequency into multiple narrow frequency bands, and the time division is obtained by the time division of the frequency band signals.

"Bands" are critical bands, or sub bands obtained by dividing the critical bands towards higher frequencies further in frequency. Grouping the spectral coefficients by frequency into bands corresponding to critical bands takes into account the frequency resolution characteristics of the human sense of hearing, as will be explained below. Grouping the spectral coefficients towards higher frequencies by frequency into bands corresponding to a fraction of a critical band increases the efficiency of the block floating applied to each band.

(b) Time and Frequency Division

In the encoder 63, the frequency range filters 11 and 12 divide the digital input signal in frequency into a frequency range signal in each of plural frequency ranges.

Each frequency range signal is then divided in time into blocks to which block floating processing and orthogonal transform processing is applied. The block length decision circuit 45 adaptively determines the block length of the blocks in each of the frequency ranges according to dynamic characteristics of the digital input signal. The digital input signal is notionally divided in time into frames. Then, after the digital input signal has been divided into plural frequency range signals, each frequency range signal is divided into the blocks in which the frequency range signal will be orthogonally transformed. Each block corresponds to a frame or an integral fraction (e.g., ½, ¼) of a frame. Thus, the maximum block length in which each frequency range signal is orthogonally transformed is equal to the frame length. The number of blocks into which each frame is divided is determined according to the dynamic characteristics of the signal.

In the encoder 63, the block floating processing circuits 42, 43, and 44 apply block floating processing to the blocks of the frequency range signal in each frequency range. Block floating processing is a normalization process that reduces the number of bits required to represent the samples in the blocks of the frequency range signals with a given accuracy. This reduces the complexity of orthogonal transform circuitry. Block floating processing is preferably applied to each block of each frequency range signal, but may alternatively be applied to a subdivision of a block, or to plural blocks.

Additionally, in the encoder 63, the block floating processing circuits 46, 47, and 48 apply block floating processing to the spectral coefficients resulting from the orthogonal transform. Block floating processing may be applied to the spectral coefficients in a critical band, in a group of critical bands, or, in critical bands towards higher frequencies, in a sub-band obtained by dividing the critical band in frequency. In the embodiment shown, the block floating processing circuits 46, 47, and 48 apply block floating to bands corresponding to critical bands towards lower frequencies, and to bands corresponding to a fraction of a critical band at higher frequencies.

In FIG. 4, the digital audio input signal, a 16-bit PCM audio signal with a sampling frequency of 44.1 kHz and having a frequency range of 0 Hz to 22 kHz, is fed into the input terminal 10. The digital audio input signal is fed from the input terminal 10 via the low-pass filter 40 into the frequency range division filter 11. The frequency range division filter 11 divides the digital audio input signal into a frequency range signal in the frequency range of 0 Hz through 11 kHz, and a frequency range signal in the high frequency range of 11 through 22 kHz. The frequency range division filter 12 further divides the frequency range signal in the frequency range of 0 Hz through 11 kHz into a frequency range signal in the low frequency range of 0 Hz through 5.5 kHz, and a frequency range signal in the middle frequency range of 5.5 through 11 kHz. Thus, the bandwidth of the low frequency range and that of the middle frequency range are equal. The frequency range division filters 11 and 12 are, e.g., quadrature mirror (QMF) filters. QMF filters are described in R. E. Crochiere, *Digital Coding of Speech in Subbands,* BELL SYST. TECH. J. Vol. 55, No. 8, 1976. A band division technique using equal bandwidth filters is described in Joseph H. Rothweiler, *Polyphase Quadrature Filters—A New Subband Coding Technique,* ICASSP 83, Boston 1983.

The frequency range signal in the high frequency range from the frequency range division filter 11 is fed via the block floating processing circuit 42 into the orthogonal transform circuit 13. The frequency range signal in the middle frequency range from the frequency range division filter 12 is fed via the block floating processing circuit 43 into the orthogonal transform circuit 14. The frequency range signal in the low frequency range from the frequency range division filter 12 is fed via the block floating processing circuit 44 into the orthogonal transform circuit 15.

The block floating processing circuits 42, 43, and 44 apply block floating to each block of the frequency range signal in the high frequency range, the middle frequency, and the low frequency range, respectively. The block length of each block is determined by the block length decision circuit 45.

The orthogonal transform circuits 13, 14, and 15 orthogonally transform each block of the respective frequency range signal from the time domain to provide spectral coefficients in the frequency domain. The orthogonal transform circuits 13, 14, and 15 are preferably modified discrete cosine transform (MDCT) circuits. Discrete cosine transform circuits or fast Fourier transform circuits could alternatively be used. A modified discrete cosine transform is described in J. P. Princen & A. B. Bradley, *Sub-Band/Transform Coding Using Filter Bank Designs Based on Time Domain Aliasing Cancellation,* ICASSP 1987 (1987).

(c) Block Lengths

FIGS. 5A through 5D show practical examples of how the digital input signal is divided in frequency into frequency ranges, and how the signal in each frequency range is notionally divided in time into frames in each of the compression modes A, B, C, and D, and how the frames of the frequency range signal in each frequency range are independently divided in time into blocks in each of the compression modes A, B, C, and D. The minimum number of blocks into which the frame of each frequency range signal can be divided is one. Thus, the maximum block length is equal to the frame length. The maximum number of blocks into which the frame of the frequency range signal in each frequency range in each compression mode may be divided is indicated by the vertical broken lines. The actual division into blocks depends on the dynamic characteristics of the digital input signal, or of one or more of the individual frequency range signals, as will be described below. In response to the compression mode signal, the block length decision circuit 45 increases the frame length or the maximum block length and the low-pass filter 40 reduces the bandwidth of the digital input signal when compression mode with a lower bit rate is selected.

In compression mode A, the block length decision circuit 45 sets the frame length to 11.6 ms, and the low-pass filter 40 sets the bandwidth of the digital input signal to 22 kHz. When the digital input signal is temporally quasi-static, the block length decision circuit 45 causes the frequency range signals to be divided in time such that the block lengths of all three frequency range signals are equal to the frame length, i.e., 11.6 ms. As the digital input signal becomes more dynamic, the block length decision circuit progressively reduces the block lengths. In the low and middle frequency ranges, the frequency range signals are divided in time such that each frame can be divided into as many as four blocks, each 2.9 ms long. In the high frequency range, the frequency range signal is divided in time such that each frame can be divided into as many as eight blocks, each 1.45 ms long.

The block length decision circuit progressively reduces the block length of each frequency range signal from the maximum block length, corresponding to the frame length, to the minimum block length. When the digital input signal is substantially static, the frequency range signal is divided into blocks having a block length equal to the frame length. As the digital input signal becomes progressively more dynamic, the frequency range signal is divided into blocks having a block length equal to one-half of the frame length, then into blocks having a block length equal to one-fourth of the frame length, etc., until the minimum block length is reached. Moreover, under certain dynamic conditions, such as a transient occurring during a frame, a frame of a frequency range signal may be divided asymmetrically. For example, the frame may be divided into a three blocks, one of which has a block length of one-half of the frame length, and two of which have a block length equal to one fourth of the frame length. Finally, the frequency range signals in one frame of the digital input signal may be divided into different numbers of blocks.

In compression mode B, the block length decision circuit 45 sets the frame length, and hence the maximum block length, to be twice that in compression mode A, i.e., to 23.2 ms, and the low-pass filter 40 reduces the upper frequency limit of the digital input signal to 13 kHz. When the digital input signal is temporally quasi-static, the block length decision circuit 45 sells a block length equal to the frame length, i.e., 23.2 ms. As the digital input signal becomes more dynamic, the block length decision circuit progressively reduces the block length, as described above. In the low and middle frequency ranges, the frequency range signals are divided in time such that each frame can be divided into as many as eight blocks, each 2.9 ms long. In the high frequency range, the frequency range signal is divided in time such that each frame can be divided into as many as sixteen blocks, each 1.45 ms long.

Since the upper frequency limit of the digital input signal extends only to 13 kHz, the encoder 63 includes the downsampling circuit 41 to down sample the frequency range signal in the high frequency range by a factor of two or four. This avoids needless signal processing at frequencies equal to and above the upper frequency limit.

In compression modes C and D, the block length decision circuit 45 further increases the frame length, to three times and four times, respectively, the compression mode A frame length. Also, the low-pass filter 40 further reduces the upper frequency limit of the digital input signal to 5.5 kHz and 3 kHz, respectively.

To facilitate conversion from the compression mode A to compression mode B, the maximum block length may be doubled only in one or more of the lower frequency ranges, as will be described in detail below. Consequently, when the compressed signal convened from one compression mode to another, only the spectral coefficients resulting from orthogonally transforming the low frequency range signal in the compressed signal are inversely orthogonally transformed, and the resulting restored low frequency range signal is then orthogonally re-transformed with an increased maximum block length. This makes it easier to provide compression mode conversion than if the spectral coefficients in all the frequency ranges were inversely orthogonally transformed, followed by orthogonally re-transforming the resulting restored frequency range signals. The resulting reduced amount of processing makes it possible to provide high-speed copying from the magneto-optical disc 1 to the IC memory card 2 simultaneously with conversion of the signal reproduced from the magneto-optical disc from compression mode A to compression mode B. Reducing the amount of processing in this way is feasible because audio signal components in the higher frequency ranges undergo more rapid temporal fluctuations than those of the lower frequency range, and a lower signal-to-noise ratio is tolerable for signal components in the high frequency range.

The frame length and the upper frequency limit of the digital input signal need not be different in all the compression modes: some compression modes may use the same frame length and/or upper frequency limit. Even though the frame length is increased in the compression modes having lower bit rates, a shorter frame length, with blocks equal to or a fraction of the frame length, may be selectively used for encoding, to shorten the temporal processing delay.

(d) Masking, Critical Bands, and Quantizing Noise

The encoder according to the invention takes advantage of a psychoacoustic property of the human sense of hearing called "masking." Masking is a psychoacoustic phenomenon in which a signal or noise is rendered inaudible, or is "masked," by other signals occurring simultaneously with, or slightly earlier than, or later than, the signal or noise. Masking may be classified into time domain masking, in which masking provided by signals occurring earlier or later than the masked signal, and concurrent masking, in which masking is provided by simultaneously-occurring signals having a frequency different from the frequency of the masked signal.

Masking enables a signal to render inaudible any noise within its time or frequency masking range. This means that a digital encoding system that produces quantizing noise may have quantizing noise levels that are high compared with the noise level that is allowable in the absence of a signal, provided that the quantizing noise lies within the masking range of the signal. Since relatively high levels of quantizing noise are allowable if masked by the signal, the number of bits required to represent the signal, or parts of the signal, with an acceptably low level of quantizing noise may be significantly reduced.

A critical band is a measure of the range of frequencies that can be masked by a signal. A critical band is a band of noise that can be masked by a pure signal that has the same intensity as the noise, and has a frequency in the middle of the critical band. The bandwidth of successive critical bands increases with increasing frequency. The audio frequency range of 0 Hz to 22 kHz is normally divided into, e.g., 25 critical bands.

In this description of the invention, reference will occasionally be made to the quantizing noise of a compressed signal. The quantizing noise of a compressed signal is the quantizing noise in the analog signal resulting from expanding and D/A converting the compressed signal.

(e) Adaptive Bit Allocation

Returning now to FIG. 4, in the encoder 63, the spectral coefficients resulting from the orthogonal transform circuits 13, 14, and 15 orthogonally transforming the blocks of the frequency range signals derived from digital input signal are grouped together by frequency into bands. The bands towards lower frequencies correspond to critical bands, the bands towards higher frequencies correspond to critical bands further divided in frequency to increase the efficiency of the block floating processing applied to each band.

The spectral coefficients grouped into bands are fed to the block floating processing circuits 46, 47, and 48, which apply block floating processing to the spectral coefficients in each band. From the block floating processing circuits 46, 47, and 48, the spectral coefficients pass to the quantizing circuit 18. In the quantizing circuit, the spectral coefficients in each band are quantized using the number of bits allocated for quantizing the spectral coefficients in the band determined by the adaptive bit allocation calculating circuit 20. The adaptive bit allocation calculating circuit allocates the total number of quantizing bits available for quantizing the spectral coefficients among the bands and provides bit allocation information to the quantizing circuit 18. The total number of bits available for quantizing the spectral coefficients depends on the bit rate of the selected compression mode.

The adaptive bit allocation calculating circuit 20 receives the spectral coefficients from the orthogonal transform circuits 13, 14, and 15 via the block floating release circuit 52, which releases the block floating processing applied by the block floating processing circuits 42, 43, and 44. The adaptive bit allocation calculating circuit 20 determines the number of bits to allocate to each band for quantizing the spectral coefficients in the band, and feeds the resulting bit allocation information to the quantizer 18. The quantizer re-quantizes the spectral coefficients in each band using to the number of quantizing bits allocated to the band. The spectral coefficients, re-quantized as just described, are supplied to the multiplexer 51 as the main information of the compressed signal fed from the multiplexer to the output terminal 19.

(i) Adaptive bit allocation calculating circuit—first embodiment

Figure 6:
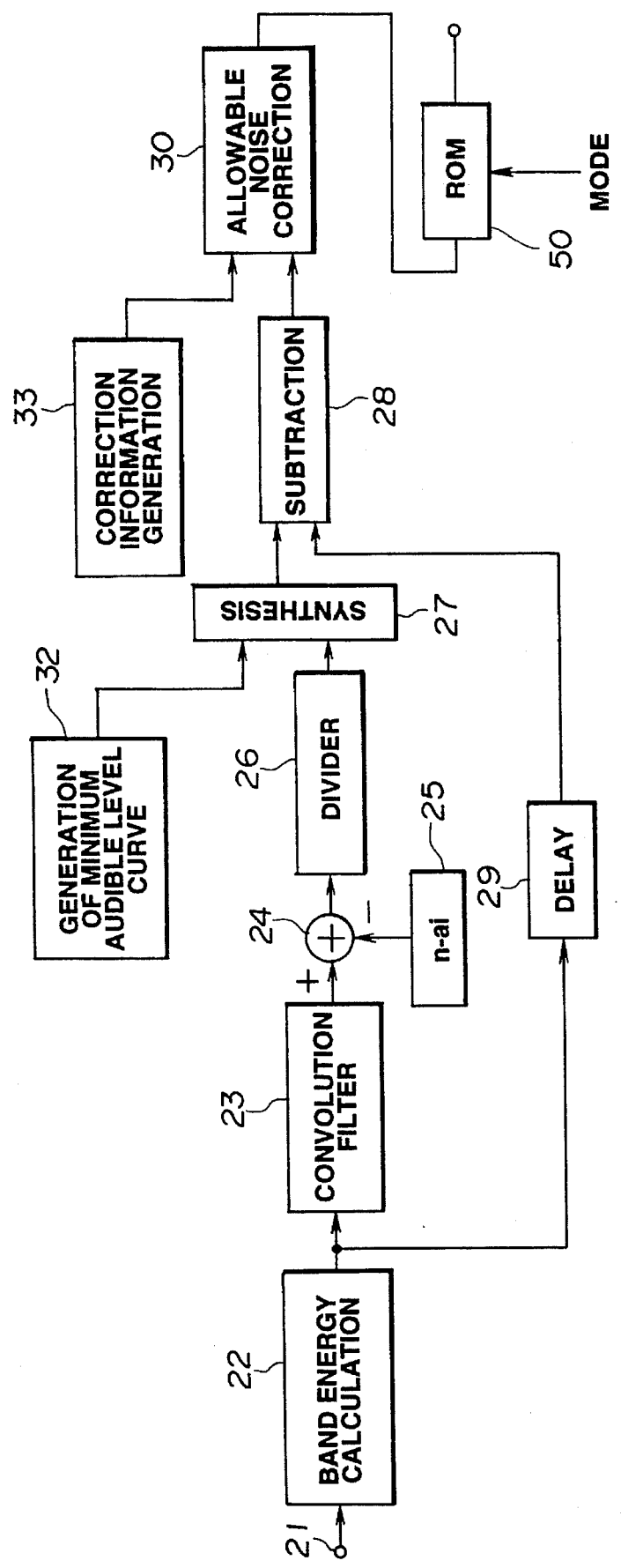
FIG. 6 is block diagram of an embodiment of the allowable noise calculating circuit 20 shown in FIG. 4.

FIG. 6 is a block diagram of a practical example of a first embodiment of the adaptive bit allocation calculating circuit 20. The adaptive bit allocation calculating circuit determines the allowable noise level for each band, taking masking into account. The adaptive bit allocation calculating circuit 20 next calculates the difference between the energy or peak signal amplitude in each band and the allowable noise level in each band and, from this information, determines the number of bits to allocate to each band for quantizing the spectral coefficients in the band.

Figure 7:
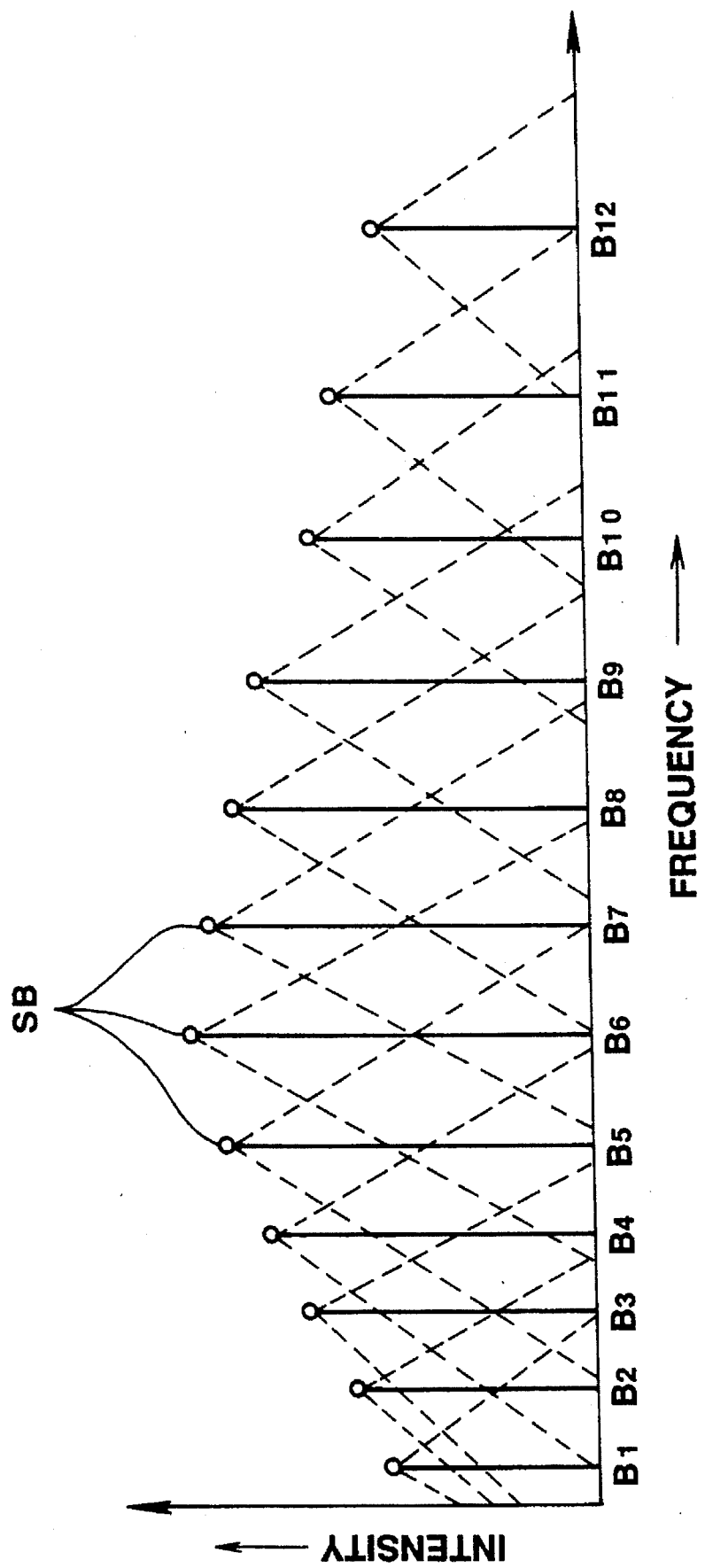
FIG. 7 shows a simplified bark spectrum, and the masking range of the spectral coefficients in each band.

The spectral coefficients from the orthogonal transform circuits 13, 14, and 15 (FIG. 4) are fed via the block floating release circuit 52 (FIG. 4) and the input terminal 21 to the band energy calculating circuit 22. The band energy calculating circuit determines the energy in each critical band by calculating the sum of the amplitudes of the spectral coefficients in the band. The band energies can also be calculated by a root-mean-square calculation using the spectral coefficients. The peak or mean values of the amplitudes of the spectral coefficients may be used instead. The output of the band energy calculating circuit 22 is a spectrum of the energy in each critical band, and is called a bark spectrum. FIG. 7 shows such a bark spectrum SB of the energies in twelve successive critical bands. The figure only shows twelve critical bands, $B_1$ through $B_{12}$, for simplicity.

To take account of the effect of the bark spectrum SB on masking, convolution processing is carried out. In the convolution processing, the bark spectrum is multiplied by predetermined weighting coefficients and the resulting products are summed. The convolution processing calculates the sum of the effects of the energies in the neighboring critical bands on the masking level in each critical band. These are indicated by the broken lines in FIG. 7.

The outputs of the band energy calculating circuit 22, i.e., the values of the bark spectrum SB, are supplied to the convolution filter circuit 23. The convolution filter circuit 23 includes plural delay elements for sequentially delaying the input bark spectrum. The convolution filter also includes plural multipliers, each of which multiplies the output of one delay element by a weighting coefficient. Preferably, 25 delay elements and 25 multipliers are used, one for each critical band. As a practical example of the weighting coefficients in the multipliers of the convolution filter circuit 23, if the weighting coefficient of the multiplier M of a given critical band is 1, the outputs of the respective delay elements are multiplied by 0.15, 0.0019, 0.000086, 0.4, 0.06 and 0.007 by the multipliers M−1, M−2, M−3, M+1, M+2 and M+3, respectively. M is an arbitrary number between 1 and 25. Finally, the convolution filter circuit includes an adder for summing the outputs of the multipliers.

The output of the convolution filter circuit 23 is supplied to the adder 24 to determine the level α corresponding to the allowable noise level in the convoluted region. The level α is the level that gives the allowable noise level for each critical band by deconvolution, as will be described below. A masking function, representing the masking level, for finding the level α is supplied to the subtractor 24. The level α is controlled by increasing or decreasing the masking function. The masking function is supplied by the (n−ai) generator 25, which will be described next.

The level α corresponding to the allowable noise level is determined by:

$$\alpha = S - (n - ai) \tag{1}$$

where i is the number of the critical band and 1 is the number of the lowest-frequency critical band, n and a are constants, a is greater than O, S is the intensity of the convoluted bark spectrum, and (n−ai) is the masking function. In the example of FIG. 6, no deterioration in sound quality is obtained with n=38 and a=1.

The level α is determined in the subtractor 24, and the result is fed into the divider 26, which deconvolutes the level α in the convoluted region. Thus, by deconvolution, the masking spectrum may be found from the level α, and the masking spectrum is used as the allowable noise level. Although deconvolution normally requires complex processing, it is carried out in the example shown in FIG. 6 by the simple divider 26.

Figure 8:
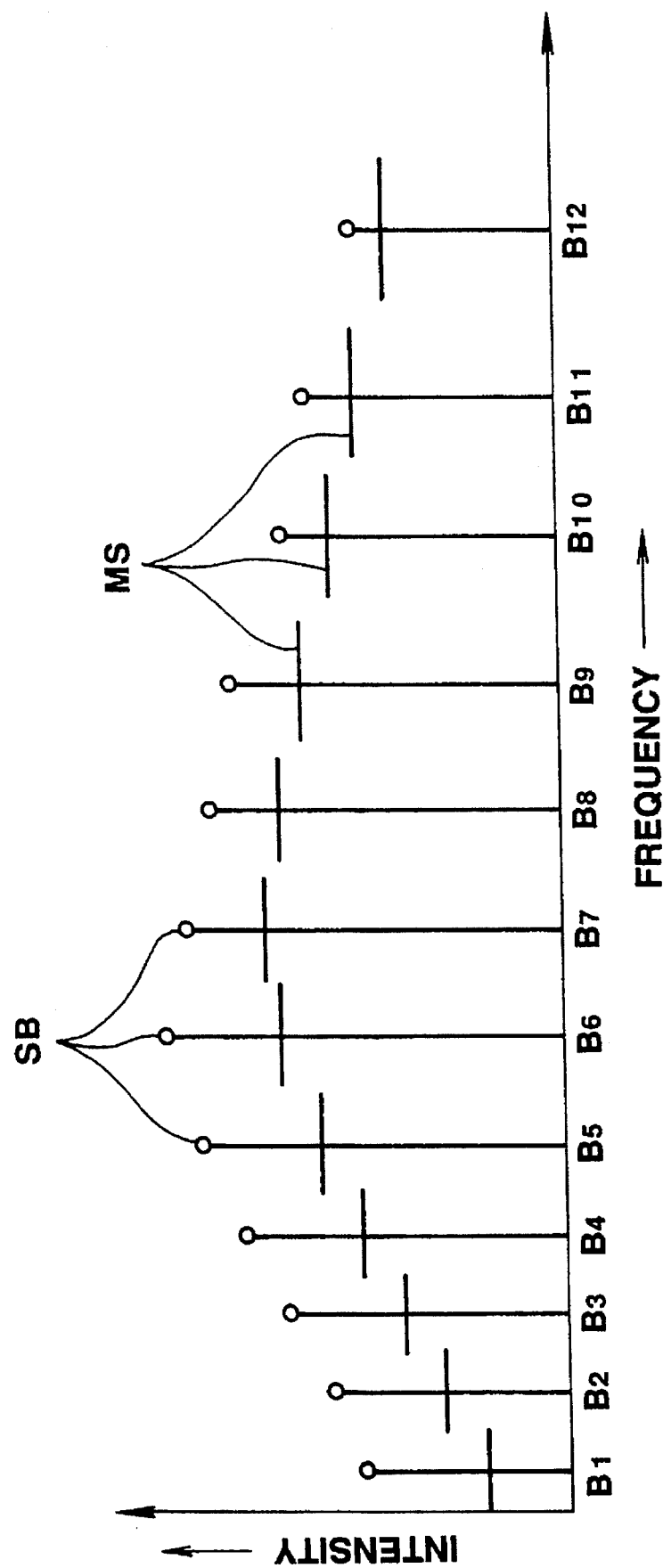
FIG. 8 shows a masking spectrum.

The masking spectrum is transmitted to the subtractor 28 through the synthesis circuit 27. The subtractor 28 also receives the output of the band energy calculating circuit 22, i.e., the bark spectrum SB, via the delay circuit 29. The subtractor 28 subtracts the masking spectrum from the bark spectrum SB, and the part of the bark spectrum below the level indicated by the masking spectrum MS is masked, as shown in FIG. 8.

The output of the subtractor 28 is fed via the allowable noise correction circuit 30 to the ROM 50, in which, e.g., plural pre-allocated bit allocation patterns are stored. Bit allocation information is read out of the ROM 50 and is fed via the output terminal 31 to the quantizing circuit 18. In response to the difference between the energy in each band and the allowed noise level for each band obtained via the allowed noise correction circuit 30 from the subtractor 28, the ROM 50 selects one of the pre-allocated bit allocation patterns and reads out an allocated bit number for each band. The quantizing circuit 18 then re-quantizes the spectral coefficients from the orthogonal transform circuits 13, 14, and 15 in each band using the allocated bit number for the band.

To summarize, the quantizing circuit 18 quantizes the spectral coefficients in each band using the number of bits allocated in accordance with the difference between the energy or peak value in the band and the allowed noise level for the band.

The delay circuit 29 is provided to delay the bark spectrum SB from the energy calculating circuit 22 to take account of the delays in the circuits preceding the synthesis circuit 27.

Figure 9:
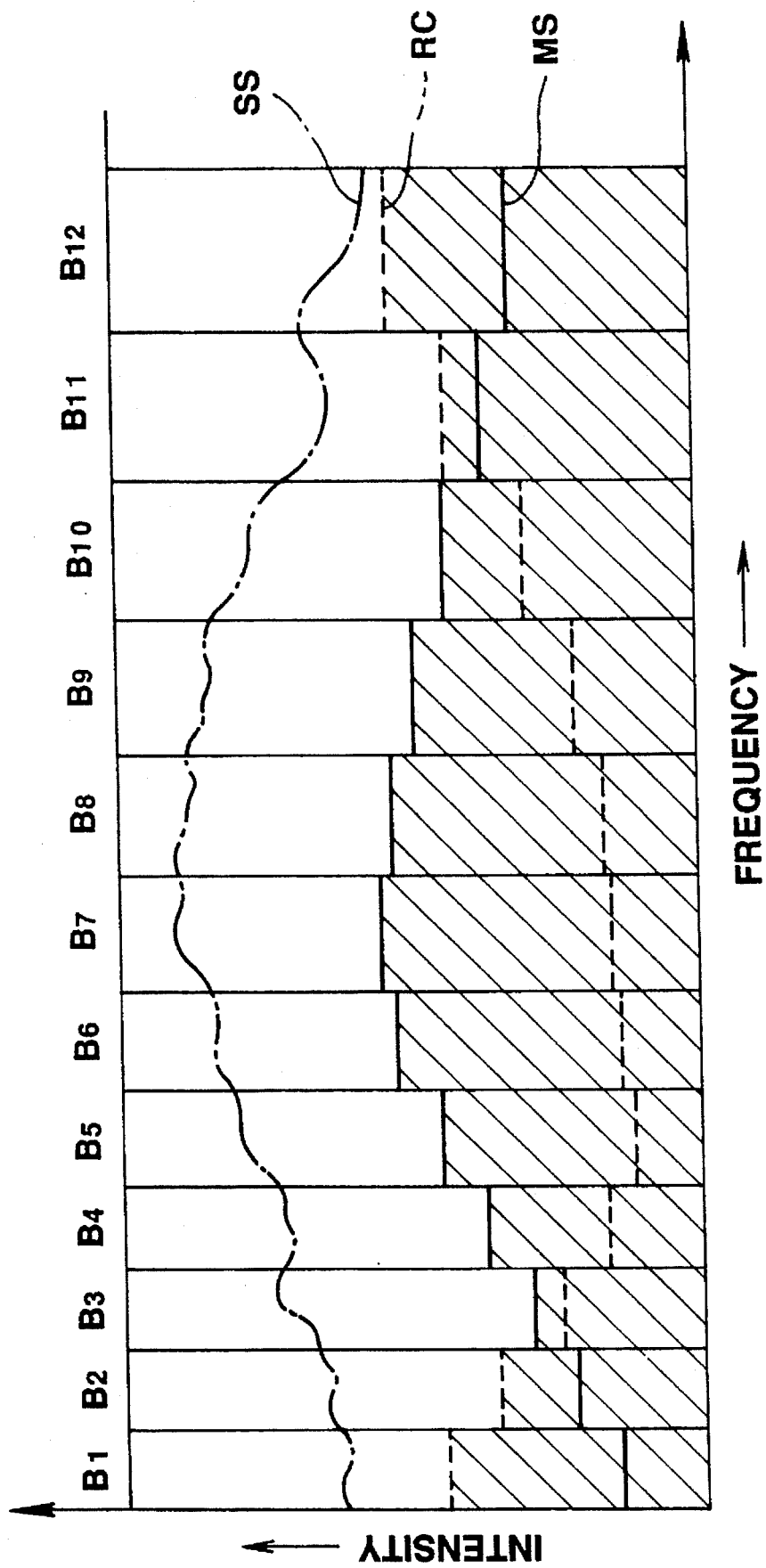
FIG. 9 shows a synthesis of the minimum audible level curve and the masking spectrum.

The synthesis circuit 27 synthesizes the masking spectrum MS and data indicating the so-called minimum audible level curve RC, which characterizes another characteristic of the human sense of hearing. This synthesis is depicted in FIG. 9. Data indicating the minimum audible level curve are provided by the minimum audible level curve generator 32. According to the minimum audible level curve, noise having an absolute level below the minimum audible level curve cannot be heard. The minimum audible level curve varies, depending upon, e.g., the acoustic level at which the output signal is reproduced. However, in a practical digital audio system, there are not great differences in the ways in which the dynamic range of music can be fit into, e.g., the dynamic range provided by a 16-bit digital system. Accordingly, if the quantizing noise level is inaudible in the frequency band in which the ear is most sensitive, i.e., in the vicinity of 4 kHz, it can be assumed that quantizing noise below the level of the minimum audible level curve cannot be heard in other frequency bands.

Accordingly, assuming that the system is used in a way such that, e.g., the noise level produced by a certain word length of the system in the vicinity of 4 kHz is inaudible, then, when the minimum audible level curve RC and the masking spectrum MS are synthesized to provide the allowable noise level, the allowable noise level can be as high as the shaded portion in FIG. 9. In this embodiment, the level at 4 kHz of the minimum audible level curve is set to correspond to the minimum level corresponding to quantizing using, e.g., 20 bits. The signal spectrum SS is also shown in FIG. 9.

The allowable noise correction circuit 30 corrects the allowable noise level at the output of the subtractor 28 using, e.g., the equal-loudness curve provided by the correction information output circuit 33. The equal-loudness curve is a yet another characteristic of the human sense of hearing. The equal-loudness curve characterizes the sound pressure levels of sounds at various frequencies that are heard with the same intensity as that of a pure sound of 1 kHz. The equal-loudness curve is substantially similar to the minimum audible level curve RC, shown in FIG. 9. According to the equal-loudness curve, for example, a sound in the vicinity of 4 kHz sounds as loud as a sound at 1 kHz with a sound pressure level about 8 to 10 dB higher. On the other hand, a sound at about 50 Hz must have a sound pressure level about 15 dB higher than the sound at 1 kHz to sound as loud.

Accordingly, it is desirable that the frequency characteristic of the noise exceeding the allowable noise level curve be corrected by a curve corresponding to the equal-loudness curve. Correcting the frequency characteristic of the allowable noise level to take account of the equal-loudness curve further takes account of the characteristics of the human sense of hearing.

The correction information output circuit 33 may also be used to correct the allowable noise level in response to information indicating the difference between the number of bits used by the quantizing circuit 18 (FIG. 4) for quantizing the spectral coefficients, and the target bit rate of the compressed signal. This correction is required because an error may exist between the total number of bits allocated in a preliminary bit allocation by the adaptive bit allocation calculating circuit 20 and the number of bits corresponding to the target bit rate of the compressed signal. Therefore, the bit allocation must be repeated to reduce the error to zero. The second bit allocation is carried out such that, when the total number of allocated bits is less than the target value, a number of bits equal to the difference is distributed among the bands to add to the bits already allocated. On the other hand, when the total number of allocated bits is greater than the target value, a number of bits equal to the difference is distributed among the bands for removal from the bits already allocated.

To carry out this operation, the error between the target value and the total number of bits allocated is detected. The correction information output circuit 33 then generates correction data for correcting the allowable noise level to change the allocated bit numbers in response to the error. When the error indicates a shortage in the number of allocated bits, more bits must be used per band. On the other hand, when the error indicates an excess in the number of allocated bits, fewer bits must be used per band.

Accordingly, the correction information output circuit 33 provides to the allowable noise level correction circuit 30 a correction value for correcting the allowable noise level from the output of the subtractor 28, e.g., according to the equal-loudness curve, and the bit allocation error. Thus, the allowable noise level from the subtractor 28 is corrected.

The allowable noise level calculating circuit 20 may be simplified by omitting the minimum audible level curve generating circuit 32 and the synthesis circuit 27, and feeding the output directly from the divider 26 to the subtractor 28.

(ii) Adaptive bit allocation calculating circuit-second embodiment

An alternative embodiment of the adaptive bit allocation circuit 20 will now be described with reference to FIG. 10. The adaptive bit allocation circuit shown in FIG. 10 allocates, to each band, level-dependent quantizing bits according to one of plural bit allocation patterns selected according to the level of the input signal, and spectrum-dependent quantizing bit according the band magnitude, weighted depending on the frequency of the band. If, for example, the number of bits available for quantizing all the spectral coefficients corresponds to a bit rate of 100 kilobits per second (kb/s), the adaptive bit allocation circuit allocates the level-dependent quantizing bits according to a selected one of a number of bit allocation patterns, each of which allocates a number of bits corresponding to the bit rate of 100 kb/s. In addition, the adaptive bit allocation circuit allocates among the bands spectrum-dependent quantizing bits corresponding to 100 kb/s.

The actual number of level-dependent bits and the actual number of spectrum-dependent bits allocated for quantizing the spectral coefficients in each band is adjusted according to the bit distribution ratio by the multiplier 402, which will be described in detail below. The total available number of bits, e.g., bits corresponding to a bit rate of 100 kb/s, is indicated by the total available number of bits indicating circuit 302. The total available number of bits is set according to the selected compression mode.

In the circuit shown in FIG. 10, the predetermined bit allocation pattern memory 411 has stored therein plural predetermined bit allocation patterns corresponding to the bit rates of the different compression modes, e.g, 128 kb/s, 64 kb/s, etc. The different predetermined bit allocation patterns for each compression mode have different bit allocations between the middle- to low-frequency bands on one hand, and the high-frequency bands on the other hand. The level-dependent bit allocation circuit 305 selects, for each frame of the digital input signal, the most appropriate one of the predetermined bit allocation patterns stored in the predetermined bit allocation pattern memory 411.

The level-dependent bit allocation circuit 305 selects the appropriate one of the plural predetermined bit allocation patterns in response to the level of the digital input signal, such that a predetermined bit allocation pattern in which fewer bits are allocated to higher-frequency bands is selected for lower input signal levels. Selecting the predetermined bit allocation pattern in this way takes advantage of the loudness effect, in which the sensitivity of the human sense of hearing at higher frequencies is reduced at lower signal levels.

The level-dependent bit allocation circuit 305 may alternatively select the appropriate predetermined bit allocation pattern in response to the level of the output of a frequency dividing circuit which divides the input signal into frequency components by means of a filter, in response to the level of one or more of the spectral coefficients provided by one or more of the orthogonal transform circuits 13 through 15 (FIG. 4), or in response to the level of one or more of the frequency range signals provided by the frequency range filters 11 and 12 (FIG. 4).

The spectrum-dependent bit allocation is carried out by the spectrum-dependent bit allocation circuit 304, in response to the weighted output of the band magnitude calculating circuit 303. The band magnitude calculating circuit receives the spectral coefficients from the orthogonal transform circuits 13 through 15 (FIG. 4) via the block floating release circuit 52 (FIG. 4) and the input terminal 400. The band magnitude calculating circuit 303 calculates the band magnitude for each band (i.e., each critical band, and each sub band obtained by dividing a higher frequency critical band in frequency), preferably by calculating the energy in each band by taking the square root of the sum of the squares of the spectral coefficients in the band. The band magnitude for each band may alternatively be calculated from the peak or mean values of the amplitudes of the spectral coefficients, or by integrating the amplitudes of the spectral coefficients.

The spectrum of the output from the band magnitude calculating circuit 303 is a bark spectrum, such as that shown in FIG. 7. To simplify FIG. 7, only twelve bands, B1 to B12, are shown instead of actual number used in a practical circuit (e.g., 52 in the example shown in FIG. 15).

The output of the band magnitude calculating circuit 303 is fed into the multiplier 410, which also receives a weighting pattern of frequency-dependent weighting coefficients, one for each band. The multiplier multiplies the magnitude of each band from the band magnitude calculating circuit 303 by the weighting coefficient for the band, defined by the weighting pattern, to provide a weighted band magnitude for each band. The weighted band magnitude for each band is fed to the spectrum-dependent bit allocation circuit 304. The preferred embodiment uses the weighting pattern shown in FIG. 10B.

The spectrum-dependent bit allocation circuit 304 allocates spectrum-dependent quantizing bits to the spectral coefficients in each band such that the spectrum-dependent bits are allocated in response to the weighted band magnitude of each band. In the embodiment shown, the spectrum-dependent bit allocation circuit allocates a number of spectrum-dependent quantizing bits equal to the total available number of quantizing bits, e.g., a number of spectrum-dependent bits corresponding to a bit rate of 100 kb/s. The actual number of spectrum-dependent bits finally allocated for quantizing the spectral coefficients is adjusted according to the bit distribution ratio by the multiplier 401, which will be described in detail below.

The spectrum-dependent bit allocation circuit 304 allocates quantizing bits among the bands according to the formula:

$$b(k) = \delta + \tfrac{1}{2} \log_2 [\sigma'^2(k)/P]$$

where b(k) is the number of spectrum-dependent quantizing bits allocated to quantize each of the spectral coefficients in the k'th band, $\delta$ is an optimum bias, $\sigma'^2(k)$ is the weighted band magnitude of the k'th band, and P is the mean quantization noise power over all the entire frequency spectrum. To find the optimum value of b(k) for each band, the value of $\delta$ is changed so that the sum of the b(k)s for all the bands is equal to, or just less than, the total number of spectrum-dependent quantizing bits.

As a preferred alternative to multiplying the band magnitudes from the band magnitude calculating circuit 303 by single weighting pattern of frequency-dependent weighting coefficients, the band magnitudes are multiplied by the weighting coefficients of a selected one of plural weighting patterns. Plural weighting patterns of frequency-dependent weighting coefficients are stored in the weighting pattern memory 406, and one of the plural weighting patterns is selected in response to the input signal.

The input signal is fed via the input terminal 404 into the weighting pattern selector 408. The weighting pattern selector 408 selects one of the weighting patterns from the weighting pattern memory 406, and feeds the selected weighting pattern into the multiplier 410. The multiplier also receives the band magnitudes from the band magnitude calculating circuit 303, and multiplies the band magnitude of each band by the weighting coefficient for the band, defined by the selected weighting pattern. The resulting weighted band magnitude for each band is fed to the spectrum-dependent bit allocation circuit 304.

Some basic weighting patterns are shown in FIGS. 10B through 10E. In addition, variations on these basic weighting patterns shown may also be stored in the weighting pattern memory 406. In the variations, the basic patterns are altered in terms of slope and turn-over frequency or frequencies to provide optimum weighting patterns for a wide range of input signal conditions.

The weighting pattern selector 408 selects the appropriate one of the available weighting patterns from the weighting pattern memory 406 according to the level of the input signal. The weighting pattern selector may additionally or alternatively take the spectral content of the digital input signal into account when selecting the appropriate one of the available weighting patterns.

As a further alternative, the weighting pattern selector 408 may calculate, in response to the digital input signal, a weighting pattern by interpolating between, e.g., two stored weighting patterns. As a further alternative, the weighting pattern selector could adjust, in response to the digital input signal, the weighting coefficients of a selected weighting pattern. In the ways just described, the adaptive bit allocation circuit changes the weighting coefficients to provide a bit allocation that is more compatible with the human sense of hearing. This improves the sound quality perceived by the listener.

An index that indicates the smoothness of the spectrum of the digital input signal controls the division of the total available number of bits between level-dependent bits allocated according to a selected one of plural predetermined bit allocation patterns and spectrum-dependent bits allocated according to the spectrum of the digital input signal. The smoothness of the spectrum of the digital input signal is a measure of the lack of tonality of the input signal. The output of the band magnitude calculating circuit 303 is fed into to the spectral smoothness calculating circuit 308. Alternatively, the spectral smoothness calculating circuit may receive the spectral coefficients via the input terminal 400. The spectral smoothness calculating circuit calculates the quotient of the sum of absolute values of the differences between the values of adjacent band magnitudes by the sum of all the band magnitudes, i.e., $$I = 0.5 \times \frac{\sum_{i=1}^{n} |S_i - S_{i-1}|}{\sum_{i=1}^{n} |S_i|}$$

where I is the spectral smoothness index, and $S_i$ is the band magnitude in the i'th band. A spectral smoothness index may alternatively be calculated using the spectral coefficients received via the input terminal 400.

The calculated spectral smoothness index I is supplied to the division ratio decision circuit 309. The division ratio decision circuit determines the division ratio D that is applied to the total available number of bits. The division ratio D is the ratio between the number of level-dependent bits and the total available number of bits. The division ratio decision circuit also calculates the complement of the division ratio, (1−D), which is the ratio between the number of spectrum-dependent bits and the total available number of bits.

The division ratio decision circuit 309 feeds the division ratio D to the multiplier 402, which is also supplied with the output of the level-dependent bit allocation circuit 305. The multiplier 402 calculates the actual number of level-dependent bits that are to be allocated to each band, taking into account the division ratio D. The division ratio decision circuit 309 also feeds the complement of the division ratio, 1−D, to the multiplier 401, which is also supplied with the output of the spectrum-dependent bit allocation circuit 304. The multiplier 401 calculates the actual number of spectrum-dependent bits that are to be allocated to each band, taking into account the division ratio D.

In an alternative arrangement, the multipliers 401 and 402 can be dispensed with, and the division ratio D can be fed into the level-dependent bit allocation circuit 305, which would then select a predetermined bit allocation pattern using the number of bits indicated by multiplying the total available number of bits, e.g., bits corresponding to a bit rate of 100 kb/s, by the division ratio. The complement of the division ratio, 1−D, would be fed to the spectrum-dependent bit allocation circuit 304, which would allocate among the bands according to the weighted band magnitude of each band a number of bits calculated by multiplying the total available number of bits, e.g., bits corresponding to a bit rate of 100 kb/s, by the complement of the division ratio.

The outputs of the multipliers 401 and 402 are fed into the adder 306. The adder 306 determines the total number of quantizing bits allocated for quantizing each spectral coefficient in each band by summing, for each block of the input signal, for each band, the value of the level-dependent bit allocation and the value of the spectrum-dependent bit allocation. For each frame of the digital input signal, the adaptive bit allocation calculating circuit 20 feeds a set of word length information to the output terminal 307. Each word length indicates the total number of bits allocated to quantize the spectral coefficients in each band. The word length information is fed as adaptive bit allocation information to the quantizer 18, where the spectral coefficients in each band are each quantized using the number of bits indicated by the word-length information for the band.

The division of the total available number of bits between level-dependent bits and spectrum-dependent bits may alternatively be determined as follows: for each band, the value of the weighted band magnitude expressed in decibels is multiplied by the spectral smoothness index R, which can have a value between 0 and 1. The resulting products are summed to find a first sum S1. The number of level-dependent bits allocated to each band is then multiplied by (1−R), and the resulting products are summed to find a second sum S2. The first and second sums, S1 and S2, are each divided by the sum of the first and second sums (S1+S2) to provide first and second ratios. The first and second ratios are then used as the bit division ratios between the spectrum-dependent bit allocation and the level-dependent bit allocation, respectively, and the total available number of bits.

Figure 10A:
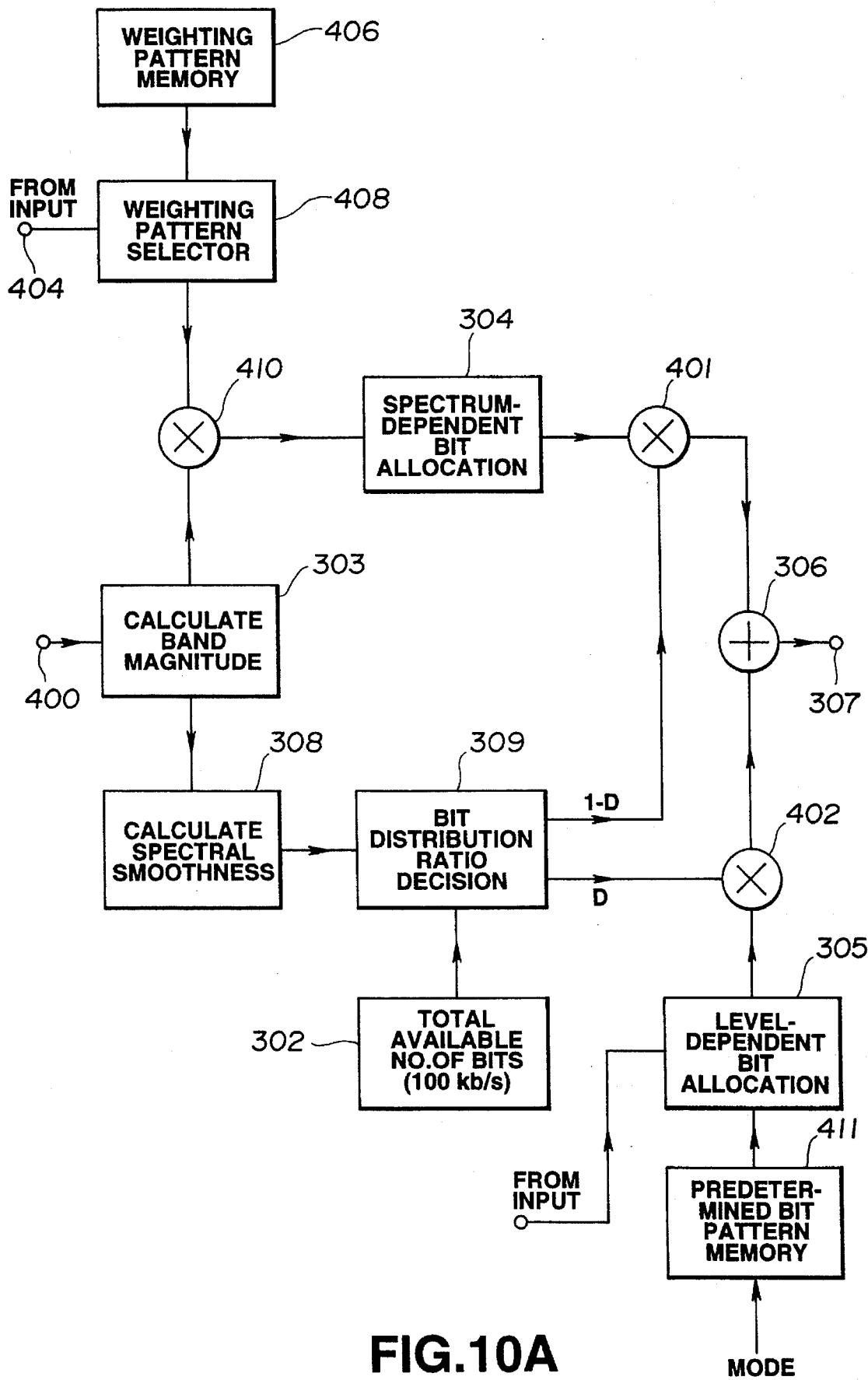
FIG. 10A is a block diagram showing an alternative embodiment of the bit allocation calculating circuit shown in FIG. 4.
Figure 10B:
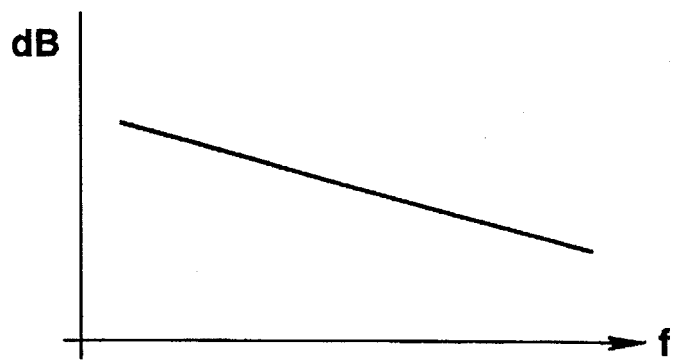
FIGS. 10B through 10E show various alternative frequency-dependent weighting patterns that are usable in the bit allocation calculating circuit shown in FIG. 10A.
Figure 10C:
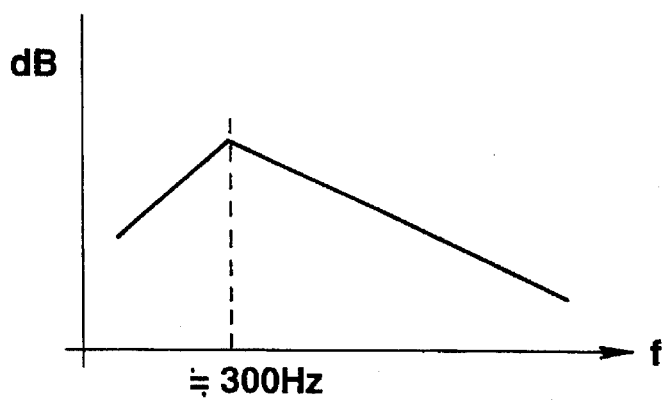
Figure 10D:
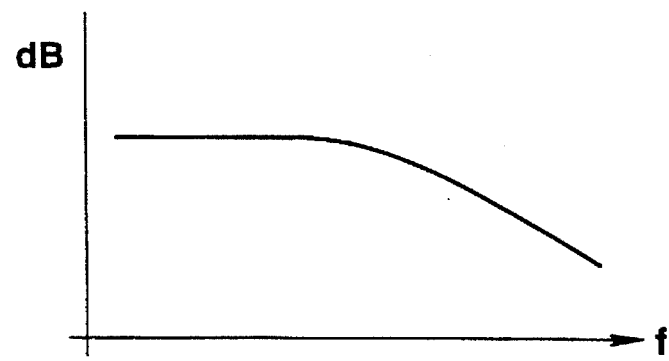
Figure 10E:
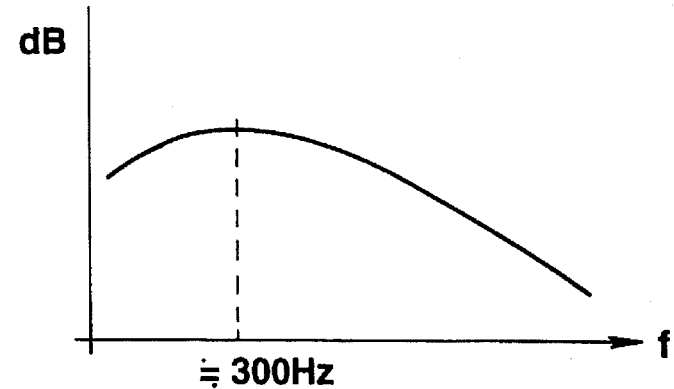
Figure 11:
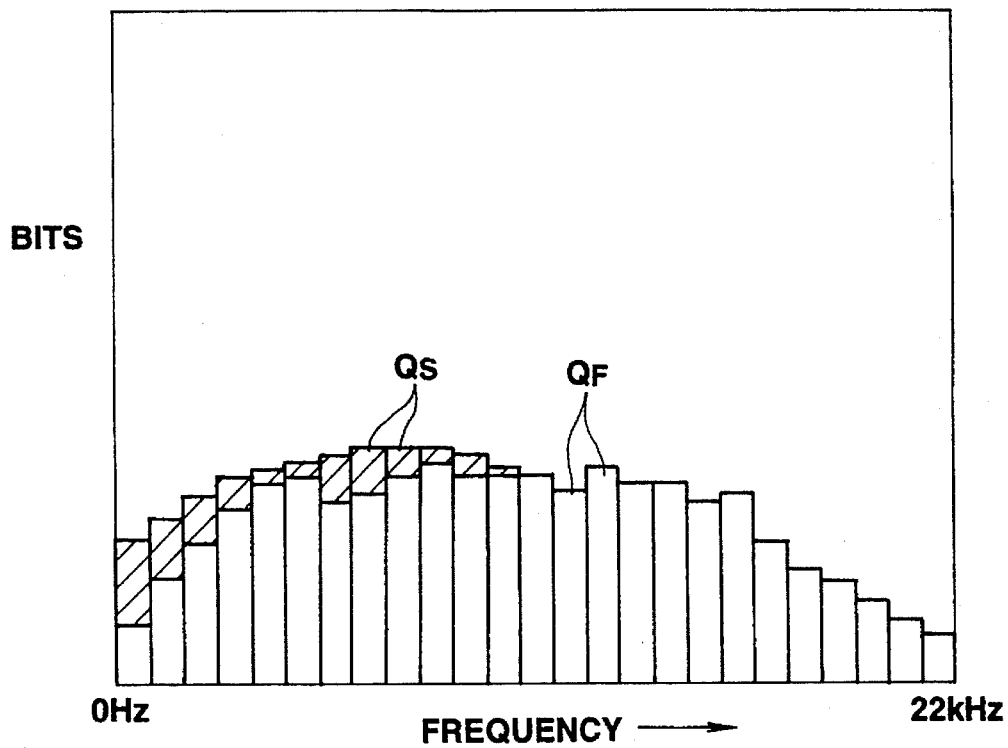
FIG. 11 is a graph showing the bit allocation performed by the bit allocation calculating circuit shown in FIG. 10 when the signal has a relatively flat spectrum.
Figure 12:
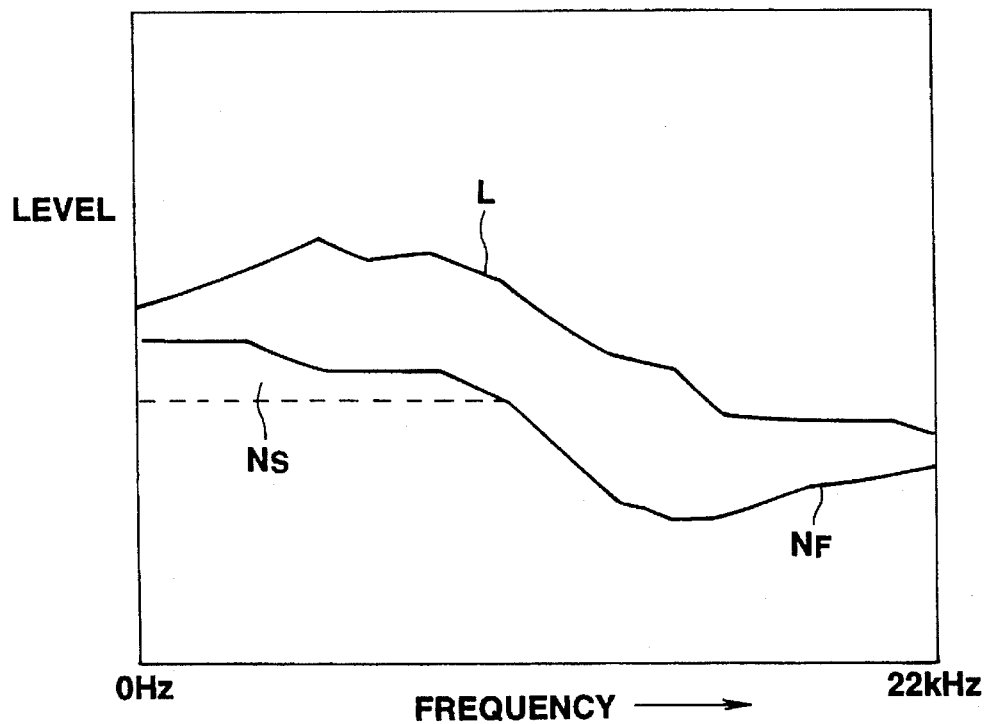
FIG. 12 is a graph showing the noise spectrum resulting from the bit allocation shown in FIG. 11.
Figure 13:
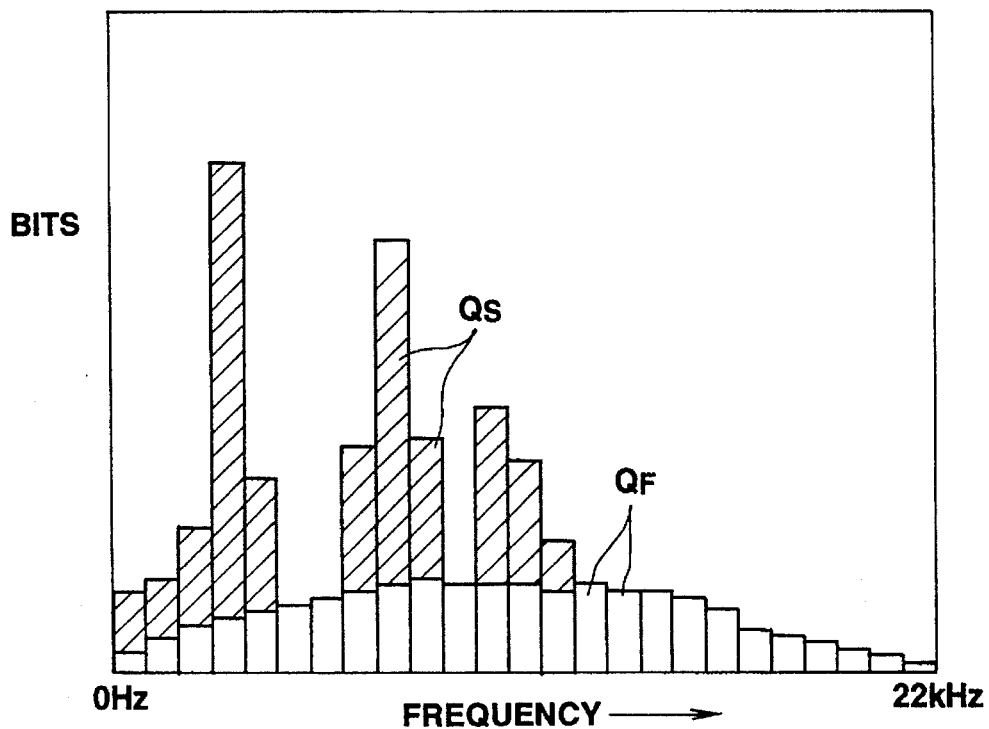
FIG. 13 is a graph showing the bit allocation performed by the bit allocation calculating circuit shown in FIG. 10 when the signal is relatively tonal.
Figure 14:
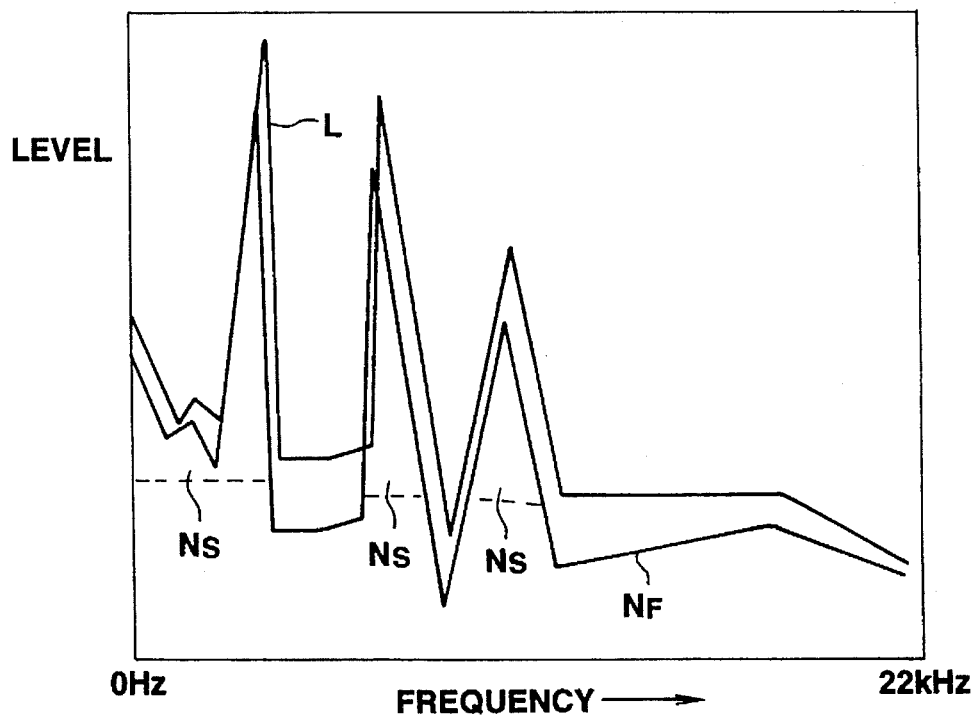
FIG. 14 is a graph showing the noise spectrum resulting from the bit allocation shown in FIG. 13.

The manner in which the alternative adaptive bit allocation circuit shown in FIG. 10A allocates quantizing bits is illustrated in FIGS. 11 and 13, and the resulting quantizing noise spectrum is shown in FIGS. 12 and 14. FIGS. 11 and 12 illustrate the bit allocation when the digital input signal has a relatively flat spectrum, whereas FIGS. 13 and 14 illustrate the bit allocation when the digital input signal is highly tonal. In FIGS. 11 and 13, QS indicates the spectrum-dependent bit allocation, and QF indicates the bit allocation according to a predetermined bit allocation pattern. In FIGS. 12 and 14, L indicates the signal level, NF indicates the noise spectrum resulting from the bit allocation according to the predetermined bit allocation pattern, and NS indicates the noise spectrum resulting from allocating the spectrum-dependent quantizing bits.

In FIGS. 11 and 12, which show the bit allocation when the digital input signal has a relatively flat spectrum, the bit allocation due to the relatively large number of bits allocated according to the predetermined bit allocation pattern provides a large signal-to-noise ratio over the entire frequency range. However, fewer bits are allocated to the spectral coefficients towards the extremes of the frequency range because the human sense of hearing is less sensitive in these areas. A relatively small number of spectrum-dependent bits are allocated to reduce the quantizing noise level in those bands having larger amplitudes, as indicated by QS in FIG. 11. The spectrum-dependent bits are allocated over a relatively large number of bands when the digital input signal has a flat spectrum.

When the digital input signal is highly tonal, as shown in FIGS. 13 and 14, quantizing noise is reduced by a relatively large spectrum-dependent bit allocation. This significantly reduces quantizing noise in the narrow signal bands indicated by NS in FIG. 14. This improves the quantizing noise characteristic when the spectrum of the digital input signal consists of one or two narrow lines.

(f) Main Information and Sub Information

The encoder 63 generates the spectral coefficients, quantized in bands using an adaptively-allocated number of quantizing bits, as described above, as a main information component of the compressed signal. The compressed signal additionally includes sub information. The sub information includes the scale factors generated in the block floating processing applied to each block and to each band, data indicating the block length in each frequency range (or the number of blocks into which each frame of each frequency range signal is divided) and the quantizing word length for each band, indicating the number of bits used to quantize the spectral coefficients in the band. The main information and the sub information are multiplexed by the multiplexer 51 to provide the compressed signal, which is fed out via the terminal 19.

4. COMPRESSION MODE SELECTION

The manner in which the encoder according to the invention provides multiple compression modes having different output bit rates and different upper frequency limits will now be described with reference to an example of an encoder that is switchable between compression mode A and compression mode B.

Figure 17:
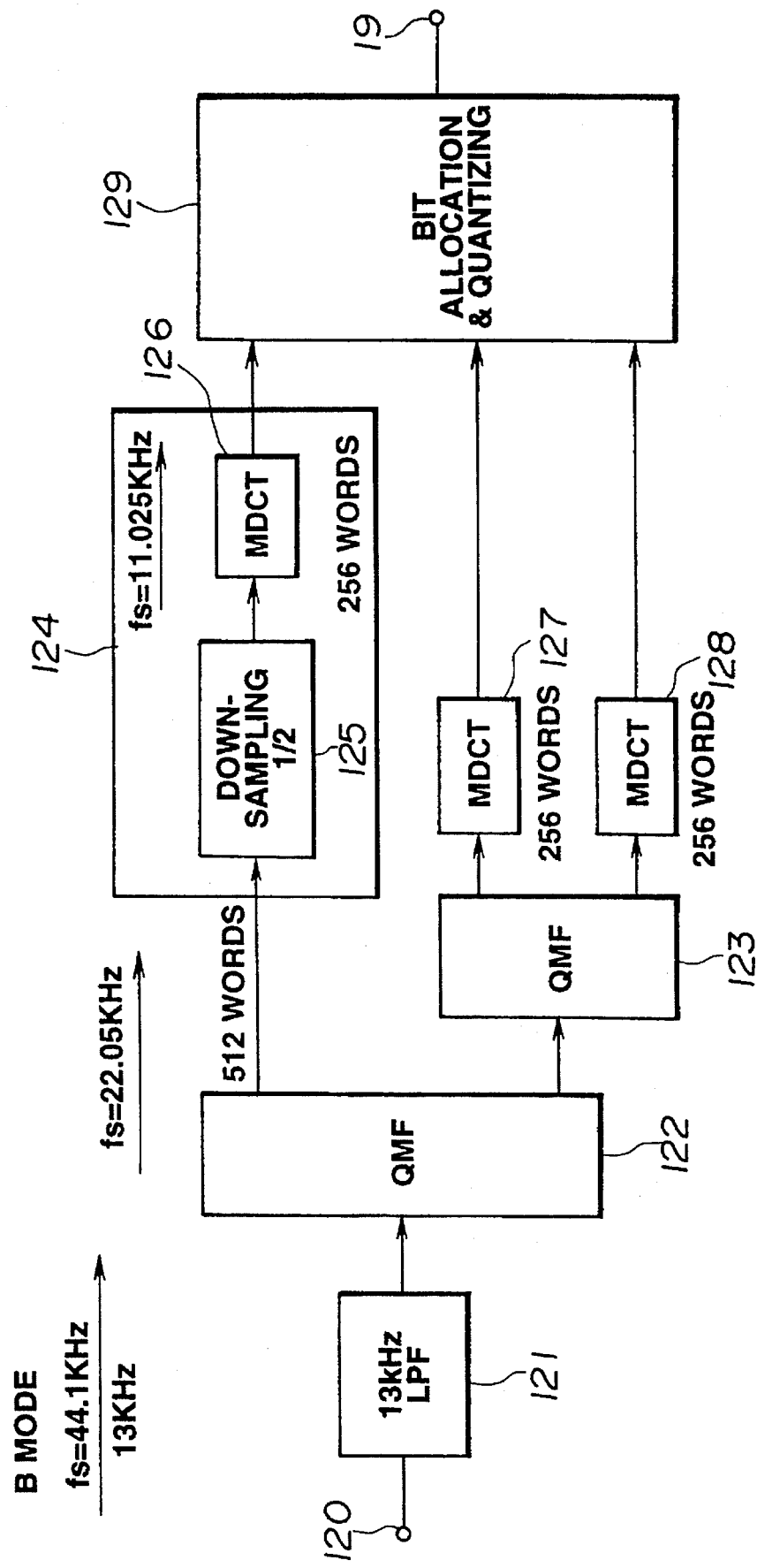
FIG. 17 is a simplified block diagram of the encoder according to the invention showing details of the down-sampling circuit in the high frequency range.

The encoder according to the invention receives the digital input signal at the same sampling frequency in all compression modes, and encodes the digital input signal using a selected one of plural compression modes. The circuit structure of the encoder according to the invention is shown in FIG. 4. In the encoder shown in FIG. 4, the low-pass filter 40 has a cut-off frequency that is switchable in response to the compression mode signal MODE if the encoder operates in compression modes in addition to compression mode A. The block length decision circuit 45 operates in response to the MODE signal to increase the frame length, and hence the maximum block length, when a lower bit rate compression mode is selected. The encoder also includes the down-sampling circuit 41, more details of which are shown in FIG. 17, which operates in response to the MODE signal. The respective ROMs in the different embodiments of the adaptive bit allocation calculating circuit 20 store a set of bit allocation patterns for each compression mode. Each set of bit allocation patterns is selected by the MODE signal, and allocates among the bands the number of quantizing bits according to the bit rate of the compression mode. The bit allocation patterns for compression modes B, C, and D allocate no bits to the bands above the upper frequency limit of the compression mode, i.e., to the bands at frequencies above 13 kHz, 5.5 kHz, and 3 kHz, respectively.

In an encoder capable of operating in more than one of the above-described compression modes, the parameters described above are changed in response to the MODE signal. In an encoder capable of operating in only one of the above-described compression modes, the above-mentioned parameters are set according to the compression mode in which the encoder operates.

Figure 16A:
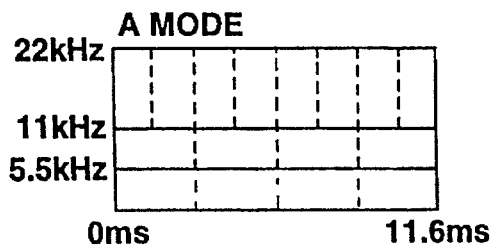
FIGS. 16A through 16C illustrates how the frame length for mode B is increased compared with that of mode A on account of the reduced the bandwidth and bit rate of mode B.
Figure 16B:
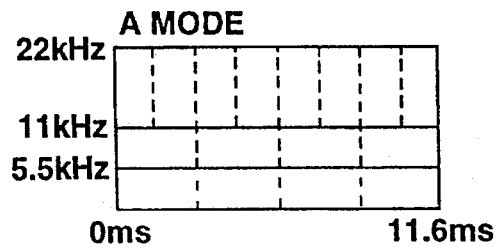
Figure 16C:
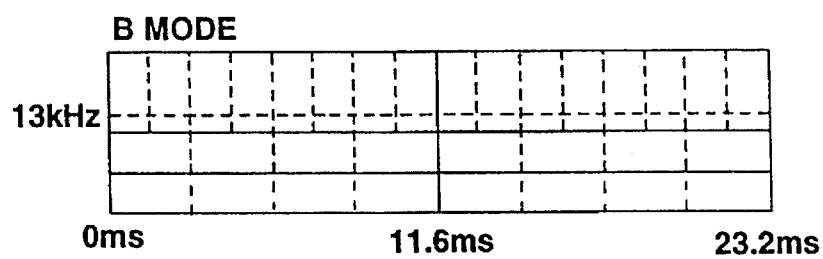

The encoder operates similarly in all the compression modes, but the block length decision circuit 45 sets a different frame length in each compression mode. The different frame lengths are multiples of the compression mode A frame length, as shown in FIGS. 5A through 5D. In compression mode A, the digital input signal is compressed in frames having a frame length of 11.6 ms, as shown in FIGS. 16A through 16C, and the division of each frequency range signal in time into blocks is carried out using the compression mode A frame length of 11.6 ms. In compression modes B, C, and D, the block length decision circuit 45 sets the frame length to twice, three times, and four times the frame length of compression mode A.

When a compression mode with a lower bit rate and a lower bandwidth is selected, the encoder according to the invention increases the maximum block length by increasing the frame length. This not only increases the amount of main information in the compressed signal, but also increases the frequency resolution of the orthogonal transform at the expense of decreasing the temporal resolution. Increased frequency resolution is desirable because reducing the bit rate reduces the number of quantizing bits available, which increases the quantizing noise. On the other hand, temporal resolution becomes less important because the upper frequency limit of the digital input signal is reduced. Moreover, since the frame length represents the maximum block length subject to orthogonal transform processing, the block length decision circuit 45 can divide the frames into blocks as short as 1.4.5 ms to provide adequate temporal resolution when this is needed, irrespective of the frame length.

Processing the frequency range signals in blocks as long as 46.4 ms (1024 samples) requires a large amount of memory. Some of the benefits of using large blocks may be had without processing large blocks by orthogonally transforming each frequency range signal in compression mode A frames, and then forming large blocks of the spectral coefficients resulting from orthogonally transforming two, three or four compression mode A frames of the frequency range signals in compression modes B, C, and D.

5. COMPRESSION MODE CONVERSION

Conversion from one compression mode to another will now be described, taking, as an example, conversion from compression mode A to compression mode B. As shown in FIGS. 16A through 16C, the encoder first determines whether two consecutive compression mode A blocks have been orthogonally transformed with a block length equal to the compression mode A frame length of 11.6 ms. If this condition is met, the encoder next determines whether the scale factors and the word lengths of the two consecutive blocks are the same. If this condition is also met, the scale factors and word lengths of the two consecutive blocks are made common to a large block consisting of the two blocks. This reduces the amount of sub information required for the two blocks constituting the large block, and allows the amount of the main information in the mode B compressed signal to be increased. This reduces the impairment of the sound quality due to reducing the bit rate.

When the digital input signal is compressed in compression mode A in blocks having a block length equal to the frame length, i.e., 11.6 ms, the resulting spectral coefficients in the frequency range of 0 Hz to 22 kHz are grouped by frequency into 52 bands, as indicated by the vertical broken lines in FIG. 15. At low and middle frequencies, the bands correspond to critical bands; at high frequencies, the bands correspond to fractions of critical bands to increase the efficiency of the block floating processing applied to the bands. Of the 52 bands, 20 are in the low frequency range (0 Hz to 5.5 kHz), 16 are in the middle frequency range (5.5 kHz to 11 kHz), and 16 are in the high frequency range (11 kHz to 22 kHz).

In the encoder according to the invention, each time the block length decision circuit 45 (FIG. 4) causes the length of a block to be halved, the number of spectral coefficients resulting from orthogonally transforming each block of the respective frequency range signal is also halved, and the frequency spacing of the spectral coefficients is doubled. When this occurs, the bandwidth of each band is doubled, which halves the number of bands. The bandwidth of the bands is doubled at least towards higher frequencies, where the grouping of the spectral coefficients into bands is made in consideration of the efficiency of the block floating processing applied to each band. Doubling the bandwidth of the bands towards higher frequencies keeps the total number of bands towards higher frequencies derived from each frame of the frequency range signal constant, irrespective of the number of blocks into which each frame is divided. This avoids an increase in the amount of sub information generated when a frame is orthogonally transformed as more than one block.

Referring to FIGS. 16A through 16C, in compression mode A, the sub information includes the scale factor and the word length for each of the 20 bands in the low frequency range resulting from orthogonally transforming each frame of 11.6 ms, whereas in compression mode B, the sub information includes the scale factor and the word length for the 20 bands in the low frequency range for each frame of 23.2 ms. In the middle and high frequency ranges, maximum block length is not increased, but the amount of sub information is halved by doubling the frequency width of each band. Consequently, in the middle frequency range, the sub information for each frame of 23.2 ms consists of 16 scale factors and word lengths. In the high frequency range, the amount of sub information for each frame of 23.2 ms is further reduced by not allocating quantizing bits (and, hence, not generating sub information) to bands at frequencies higher than the upper frequency limit of the compression mode.

Some additional details of bandwidth reduction in the compression modes with a low bit rate will now be described. A compressed signal in compression mode B can be produced in two alternative ways, namely, by directly compressing an analog or digital input signal to provide the compression mode B compressed signal, or by additionally compressing a compression mode A compressed signal to provide the compression mode B compressed signal.

(a) Direct Compression in Compression Mode B

A practical arrangement for directly compressing a digital input signal to provide a mode B compressed signal is shown in FIG. 17. Referring to FIG. 17, the digital input signal with a sampling frequency of 44.1 kHz is fed via the input terminal 120 to the low-pass filter 121. The cut-off frequency of the low-pass filter reduces the upper frequency limit of the digital input signal to that of compression mode B. For example, in compression mode B, the low-pass filter 121 reduces the upper frequency limit of the digital input signal to 13 kHz. The bandwidth-limited signal from the low-pass filter 121 is fed to the frequency range division filters 122 and 123, which are similar to the frequency range division filters 11 and 12 shown in FIG. 4, and are preferably quadrature mirror (QMF) filters.

In compression mode B, the frequency range signals in the low and middle frequency ranges from the frequency range filter 123 are notionally divided into frames, are divided into blocks corresponding to a frame or a fraction of a frame, and block floating processing is applied. The processed blocks are then orthogonally transformed by the orthogonal transform circuits 127 and 128 in a manner similar to the way in which the blocks are orthogonally transformed in compression mode A. The processed blocks have block lengths of 23.2 ms, 11.6 ms, or 2.9 ms, depending on the dynamic characteristics of the signal.

The frequency range signal in the high frequency range is fed from the frequency range dividing filter 122 to high frequency range processing circuit 124. In the high frequency range processing circuit, the high frequency range signal is fed into the down-sampling circuit 125, where it is down sampled by a factor of two. The resulting down-sampled frequency range signal, in which the number of samples in each frame is halved, is divided into blocks, each corresponding to a frame or a fraction of a frame. The blocks have a block length of 23.2 ms, 11.6 ms, or 2.9 ms, depending on the dynamic characteristics of the signal. Block floating is applied to the blocks, and the resulting processed blocks are orthogonally transformed by the orthogonal transform circuit 126.

The spectral coefficients from the orthogonal transform circuits 126, 127, and 128 are grouped into bands having a frequency width that depends on the block length in which the frequency range signal was transformed. Increasing the frequency width of the bands when the block length of the blocks is reduced maintains the amount of sub information constant, irrespective of the block length. For example, in the frequency range between 11 kHz and 15 kHz, when the block length is 23.2 ms, the spectral coefficients are grouped into eight bands, each band having its own sub information; when the block length is 11.2 ms, the spectral coefficients are grouped into four bands, each band having its own sub information; and, when the block length is 2.9 ms, the spectral coefficients are grouped into one band having its own sub information.

The spectral coefficients from the orthogonal transform circuits 126, 127, and 128 are fed into the quantizing circuit 129, which is similar to the quantizing circuit 18 shown in FIG. 4. However, bit allocations optimized for the selected compression mode, i.e., compression mode B, are selected from among the bit allocation patterns stored in the ROMs in the adaptive bit allocation circuit 20. The quantized spectral coefficients are fed to a multiplexer (not shown) where they are combined with the sub information to provide the digital output signal, which is fed to the output terminal 19.

Alternatively, the high frequency range signal processing circuit 124 can implement down sampling by a factor of four. As a further alternative, if a bandwidth extending to 11 kHz is acceptable in compression mode B, the high frequency range signal processing circuit 124 may be omitted altogether. In addition, in the bit allocation patterns for this alternative compression mode B, no quantizing bits are allocated to bands above 11 kHz.

(b) Additional Compression of a Compressed Signal

A practical example of a circuit for additionally compressing a compressed signal compressed in compression mode A (a mode A compressed signal) to provide a compressed signal compressed in compression mode B (a mode B compressed signal) will now be described with reference to FIG. 18. In the arrangement shown in FIG. 18, when the mode A compressed signal consists of a succession of sets of quantized spectral coefficients resulting from orthogonally transforming blocks having a block length of 11.6 ms, and changes in the time domain in the block floating coefficients of the blocks are less than a pre-set value, inverse quantizing and an inverse orthogonal transform is applied to each set of quantized spectral coefficients to provide blocks of restored frequency range signals. Then consecutive pairs of blocks of the restored frequency range signals are orthogonally re-transformed with the mode B block length of 23.2 ms. This reduces the quantity of sub information.

Figure 18:
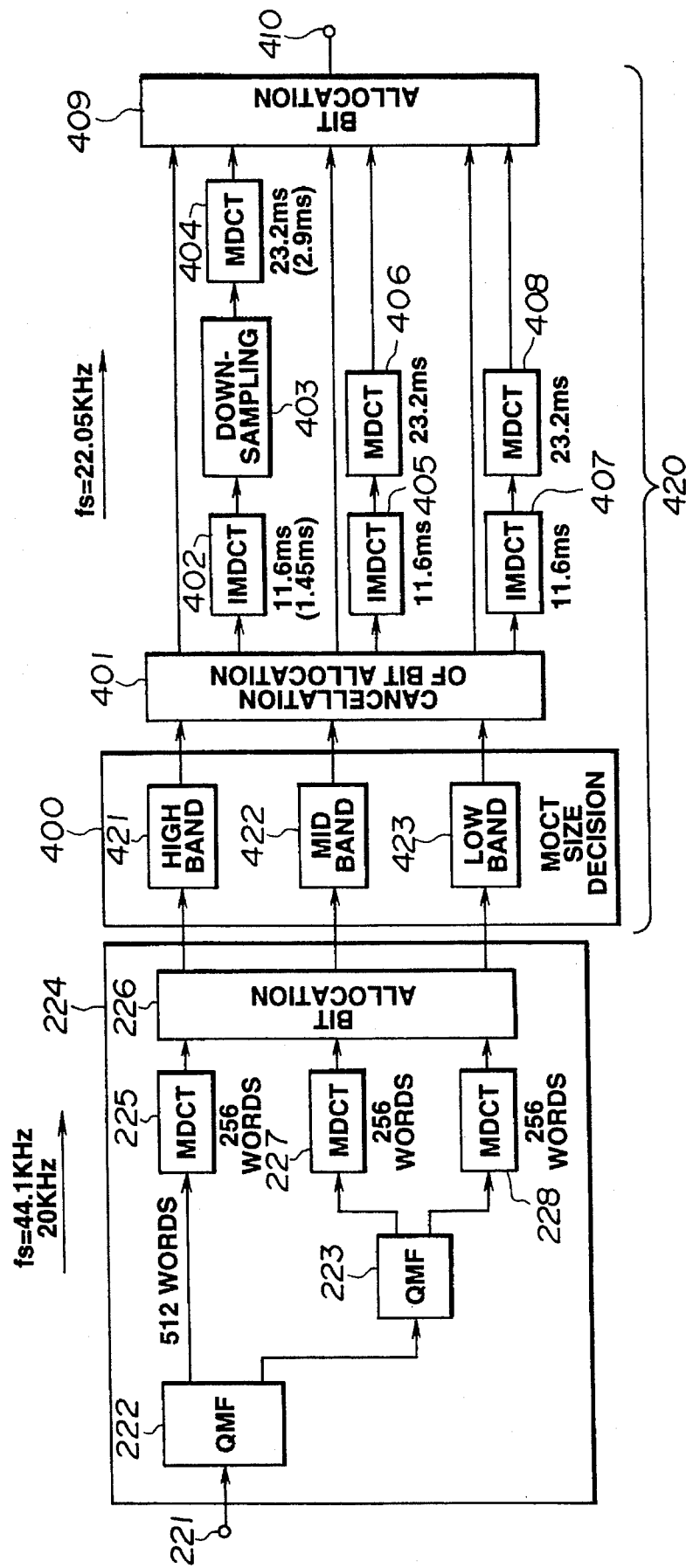
FIG. 18 is a block diagram showing a circuit for converting a compressed signal from one compression mode to another in which the frame lengths are changed between the different compression modes.

Referring to FIG. 18, the digital input signal with a sampling frequency of 44.1 kHz and an upper frequency limit of 22 kHz is supplied via the input terminal 221 to the mode A encoder 224, where it is compressed to provide a mode A compressed signal. The mode A compressed signal is shown as three frequency range components in FIG. 18.

In the mode A encoder 224, the digital input signal is divided in frequency into frequency range signals in each of three frequency ranges by the frequency range dividing filters 222 and 223. The frequency range dividing filters 222 and 223 are similar to the frequency range dividing filters 11 and 12 described above with reference to FIG. 4, and preferably QMF filters. The frequency range signal in the high frequency range from the frequency range dividing filter 222 is fed into the orthogonal transform circuit 225, and the other frequency range signal is fed from the frequency range dividing filter 222 to the frequency range dividing filter 223, where it is divided into frequency range signals in the middle and low frequency ranges. The frequency range signals in the middle and low frequency ranges are fed into the orthogonal transform circuits 227 and 228. The orthogonal transform circuits 226, 227, and 228, which are preferably modified discrete cosine transform circuits, orthogonally transform the frequency range signals received from the frequency range dividing filters in blocks having the compression mode A maximum block length of 11.6 ms. The spectral coefficients from the orthogonal transform circuits 226, 227, and 228 are grouped by frequency into bands, and are quantized using an adaptive bit allocation by the bit allocation and quantizing circuit 226.

The quantized spectral coefficients and the respective sub information in each of the frequency ranges are fed from the mode A encoder 224 into the additional compressor 420. In the additional compressor 420, the orthogonal transform size determining circuit 400 includes an orthogonal transform block size determining unit for each frequency range, which determines the orthogonal transform block size in the respective frequency range. Thus, the spectral coefficients in the high frequency range, the middle frequency range, and the low frequency range are respectively fed into the high frequency range orthogonal transform size determining unit 421, the middle frequency range orthogonal transform size determining unit 422, and the low frequency range orthogonal transform size determining unit 423. From the scale factors in the sub information, the orthogonal transform size determining units 421, 422, and 423 determine the block size of the orthogonal transforms with which the respective frequency range signals were orthogonally transformed in the mode A encoder. In the example shown in FIG. 18, the block lengths are determined to be 11.6 ms.

The inverse quantizer 401 separates the quantized spectral coefficients from the sub information in the outputs in the respective frequency ranges from the orthogonal transform size determining circuit 400. The inverse quantizer also inversely quantizes the quantized spectral coefficients in each band using the word length information in the sub information for the band. The inverse orthogonal transform circuits 402, 405, and 407 inversely orthogonally transform the resulting spectral coefficients in each respective frequency range to provide a respective restored frequency range signal in each frequency range.

The down-sampling circuit 403 down samples the restored frequency range signal in the high frequency range by a factor of two to reduce the number of samples in the restored frequency range signal by the same factor. The orthogonal transform circuit 404 then orthogonally re-transforms the down-sampled restored frequency range signal in blocks having a block length of 23.2 ms. The orthogonal transform circuit 406 orthogonally re-transforms the restored frequency range signal in the middle frequency range from the orthogonal transform circuit 405 in blocks having a block length of 23.2 ms. The orthogonal transform circuit 408 orthogonally re-transforms the restored frequency range signal in the low frequency range from the orthogonal transform circuit 407 in blocks having a block length of 23.2 ms.

The adaptive bit allocation and quantizing circuit 409 groups the spectral coefficients produced by the orthogonal transform circuits 404, 406, and 408 by frequency into bands, and quantizes the spectral coefficients in each band using an adaptive bit allocation of the number of quantizing bits provided by compression mode B. The resulting quantized spectral coefficients and sub information for each band are included in the mode B compressed signal, which is fed to the output terminal 410. In this way, the mode A compressed signal is additionally compressed to provide a mode B compressed signal.

Alternatively, in the arrangement shown in FIG. 18, the volume of processing can be substantially reduced by not inversely orthogonally transforming and orthogonally re-transforming the spectral coefficients in the middle and high frequency ranges. In this case, the compression mode A block lengths are used as the compression mode B block lengths in the middle and high frequency ranges, and the spectral coefficients in these frequency ranges are simply re-quantized.

When copying a selection from the magneto-optical disc 1 to the IC card 2 via the additional compressor 84 (FIG. 1), the mode A compressed signal is reproduced from the magneto-optical disc. The quantized spectral coefficients and sub information for each frequency range are fed from the deformatter 71 via the buffer memory 85 into the additional compressor 84, which corresponds to the additional compressor 420 shown in FIG. 18.

Although the encoder according to the invention is described herein as generating a compressed signal from which a recording signal for recording on a magneto-optical disc or an IC card is derived, signals suitable for transmission or for distribution via suitable media such as broadcast, cable, telephone, ISDN, etc. may also be derived from the compressed signal. Accordingly, references herein to a recording signal and a recording medium are to be taken also to refer to signals for transmission or distribution via any medium.

FIG. 19 is a block diagram of the decoder corresponding to the encoder of the present invention. In FIG. 19, the input terminals 152, 154, and 156 are supplied with the quantized spectral coefficients generated by the encoder, and the input terminals 153, 155, 157 are supplied with the sub information from the encoder. The quantized spectral coefficients and the sub information are extracted by a suitable demultiplexer (not shown) from the compressed signal reproduced from the recording medium.

The quantized spectral coefficients and the sub information are fed into respective inverse quantizing circuits 146, 147, and 148, where the quantizing and the block floating applied to each band of spectral coefficients are reversed using the sub-information. The frequency widths of the bands subject to this processing depends on the compression mode. The resulting spectral coefficients are then grouped by frequency into three frequency ranges corresponding to the three frequency ranges in the encoder, and are fed into the inverse orthogonal transform circuits 143, 144, and 145. These circuits apply inverse orthogonal transform processing, such as inverse discrete cosine transform processing, complementary to the orthogonal transform processing applied by the orthogonal transform processing circuits 13, 14, and 15 in the encoder. The inverse orthogonal transform circuits 143, 144, and 145 are also supplied with sub-information so that the block floating applied by the block floating processing circuits 42, 43, and 44 in the encoder can be released.

Three restored frequency range signals are assembled in the time domain from the blocks of the restored frequency range signal generated by each of the three inverse orthogonal transform circuits 143, 144, and 145. The three restored frequency range signals are fed to the inverse quadrature mirror filters 142 and 141, where they are synthesized to provide the digital audio output signal. The digital audio output signal is fed to the output terminal 130.

If down sampling is applied to the frequency range signal in the high frequency range in the encoder, an up-sampling circuit (not shown) must be included in the decoder between the output of the inverse orthogonal transform circuit 143 and the input of the inverse quadrature mirror filter 141.

It can be seen from the above description that the present invention provides a compressor apparatus, a compression method, and a compressor/expander system in which a digital input signal is compressed in one of plural compression modes having different output bit rates. The compressor apparatus, compression method, and compressor/expander system according to the invention operate at the same sampling frequency in all compression modes. This avoids the complication inherent in a sampling frequency generating circuit that is required to generate multiple sampling frequencies, and the complication of processing circuitry operating at multiple sampling frequencies.

Further, the compressor apparatus, compression method, and compressor/expander system according to the invention allow the compression mode of a compressed signal to be changed, something that is difficult to achieve when a different sampling frequency is used in each compression mode. If it is desired to copy a compressed signal from a large capacity magneto-optical disc to a small capacity IC card, and to further compress the compressed signal to reduce the bit rate of the signal recorded on the IC card, the additional compression may be achieved using only some additional processing. It is not necessary to expand the compressed signal reproduced from the magneto-optical disc fully, and then to re-compress the expanded signal from scratch in the new compression mode.

Because of the reduced upper frequency limit of the compressed signal in the compression modes with lower bit rates, it is unnecessary to perform arithmetic and logical operations on the bands above the upper frequency limit. This provides a reduction in the number of arithmetic and logical operations, and allows the processing circuitry to be simplified. Alternatively, the unused processing capacity may be used to perform additional processing to improve the sound quality in the compression modes with low bit rates. Moreover, if an entire higher frequency range is not required, the frequency range in its entirety may be eliminated. If pan of the frequency range is required, processing may be performed only in the part of the frequency range that is actually used, and processing in the unused part of the frequency range may be eliminated.

The proportional decrease in the number of bits available for representing the main information of the compressed signal is greater than the proportional decrease in the bit rate between the compression modes. Additional measures are therefore desirable to prevent an unacceptable degradation of the sound quality when a compression mode with a lower bit rate is used. According to the present invention, the compression efficiency is improved by increasing the frame length, and hence by increasing the maximum block length subject to the orthogonal transform. By increasing the maximum block length, an accurate transformation of the signal from the time domain to the frequency domain may be achieved while reducing the amount of sub information, such as scale factors and the word length data.

Additionally, towards higher frequencies, the compressor apparatus, compression method, and compressor/expander system according to the invention broaden the frequency width of at least a majority of the bands into which the spectral coefficients resulting from the orthogonal transform are divided by frequency for the purpose of determining quantizing noise and masking. Towards lower frequencies, the compressor apparatus, compression method, and compressor/expander system according to the invention perform the orthogonal transform and the grouping into bands in a way that results in bands that correspond closely to critical bands, despite the reduction in the upper frequency limit in the low bit rate compression modes. These measures make it possible to prevent the compression efficiency from being lowered, as occurs with a conventional arrangement of bands having equal widths across the entire frequency range.

When the upper frequency limit is reduced, if the width of the bands into which the spectral coefficients are divided for the purpose of determining quantizing noise and masking remains constant with frequency, dividing the frequency range of 0 Hz to 22 kHz into 32 bands results in bands that are about 700 Hz wide. This is substantially wider than the critical bandwidth at low frequencies (typically about 100 Hz), and is wider than the critical bandwidth over most of the frequency range. This impairs the compression efficiency.

According to the present invention, the width of the bands into which the spectral coefficients are divided for the purpose of determining quantizing noise and masking is selected to be broader towards higher frequencies, and to be similar to the critical bandwidth for at least a majority of the bands. Additionally, to prevent the sound quality from being degraded in the compression modes with lower bit rates, the maximum block length subject to the orthogonal transform is increased in the compression modes with lower bit rates.

In the compression modes with lower bit rams, the wasteful use of bits is prevented by not allocating the main and subsidiary information to the bands above the upper frequency limit of the compression mode.

If the compressed signal recorded on a magneto-optical disc, as a first recording medium, is to be copied to a second recording medium, such as an IC card, the amount of arithmetic and logical operations may be reduced by directly copying the signal from one recording medium to the other, or by additionally compressing the compressed signal reproduced from the first recording medium before recording it on the second recording medium, without expanding the reproduced signal. Additionally, high-speed copying may be carried out, with the speed ratio depending on the compression ratio, so that a copy may be made in a shorter time than the real-time duration of the copied selection.

Although illustrative embodiments of the invention have been described herein in detail, it is to be understood that the invention is not limited to the precise embodiments described, and that various modifications may be practiced within the scope of the invention defined by the appended claims.

I claim:

1. Apparatus for compressing a digital input signal in a selected one of plural compression modes to provide a compressed digital signal, the plural compression modes including a first compression mode and a second compression mode, the compressed digital signal having a higher bit rate in the first compression mode than in the second compression mode, the apparatus comprising:

deriving means for deriving from the digital input signal spectral coefficients grouped by frequency and time into bands, each band having a frequency width, the deriving means including frequency width setting means for setting the frequency width of at least one of the plural bands according to the selected compression mode;

a quantizer, the quantizer receiving the bands of spectral coefficients from the deriving means, and providing bands of quantized spectral coefficients; and including means for including in the compressed digital signal the quantized spectral coefficients from the quantizer and sub information for each band.

2. The apparatus of claim 1, wherein, in the first compression mode, the frequency width setting means sets the frequency width of the at least one band to a first frequency width, and, in the second compression mode, sets the frequency width of the at least one band to a second frequency width, the second frequency width being greater than the first frequency width.

3. The apparatus of claim 2, wherein the second frequency width is an integral number of times greater than the first frequency width.

4. The apparatus of claims 2 or 3, wherein:

the digital input signal is a digital audio signal; and the deriving means groups selected ones of the spectral coefficients by frequency into bands for determining quantizing noise and masking, a majority of the bands having frequency widths set to be broader towards higher frequencies.

5. The apparatus of claim 1, wherein:

the digital input signal is a digital audio signal; and the deriving means groups selected ones of the spectral coefficients by frequency into bands for determining quantizing noise and masking, a majority of the bands having frequency widths set to be broader towards higher frequencies.

6. The apparatus of claim 5, wherein the deriving means includes means for receiving the digital input signal at a fixed sampling frequency, the sampling frequency being invariable between the compression modes.

7. The apparatus of claims 1 or 5, wherein the deriving means includes:

a low-pass filter having a cut-off frequency set according to the selected one of the plural compression modes, the low-pass filter receiving the digital input signal, and providing a frequency-limited signal, the cut-off frequency of the low-pass filter being set to a higher frequency in the first compression mode than in the second compression mode; and means for deriving the spectral coefficients from the frequency-limited signal.

8. The apparatus of claim 7, wherein the deriving means additionally includes means for receiving the digital input signal a fixed sampling frequency, the sampling frequency being invariable between the compression modes.

9. The apparatus of claim 7, wherein:

the quantizer includes adaptive bit allocating means for allocating quantizing bits among the bands, the adaptive bit allocating means allocating no quantizing bits to bands at frequencies substantially higher than the cut-off frequency of the low-pass filter; and the including means includes in the compressed digital signal no sub information for bands at frequencies substantially higher than the cut-off frequency of the low-pass filter.

10. The apparatus of claim 1, wherein the deriving means includes:

block dividing means for diving the digital input signal in time into blocks;

an orthogonal transform circuit, the orthogonal transform circuit receiving each block from the block dividing means, and providing a set of spectral coefficients in response to each block;

grouping means for grouping each set of spectral coefficients from the orthogonal transform circuit by frequency into the bands.

11. The apparatus of claim 10, wherein:

the apparatus additionally includes frequency range dividing means for dividing the digital input signal in frequency into a frequency range signal in each of plural frequency ranges;

the block dividing means is for dividing each frequency range signal in time into blocks; and the orthogonal transform circuit includes means for orthogonally transforming each block of each frequency range signal to provide the spectral coefficients.

12. The apparatus of claim 11, wherein the frequency range dividing means divides the digital input signal in frequency into a frequency range signal in each of plural frequency ranges, each frequency range having a bandwidth, the frequency ranges including a lowest frequency range, and a next-lowest frequency range, the next-lowest frequency range having a bandwidth equal to the bandwidth of the lowest frequency range.

13. The apparatus of claim 11, wherein the frequency range dividing means divides the digital input signal in frequency into a frequency range signal in each of plural frequency ranges, the bandwidth of the frequency ranges increasing with increasing frequency.

14. The apparatus of claims 12 or 13, wherein the block dividing means divides the frequency range signal in each of the frequency ranges above the lowest frequency range into blocks, each block having a maximum block length, the maximum block lengths of the blocks being invariable between the compression modes.

15. The apparatus of claim 11, wherein the block dividing means divides each frequency range signal into blocks, each block having a block length, the block lengths of the blocks having a maximum block length depending on the selected one of the compression modes, the maximum block length being greater in the second compression mode than in the first compression mode.

16. The apparatus of claim 11 or 15, wherein the frequency range dividing means divides the digital input signal in frequency into a frequency range signal in each of plural frequency ranges, each frequency range having a bandwidth, the frequency ranges including a lowest frequency range, and a next-lowest frequency range, the next-lowest frequency range having a bandwidth equal to the bandwidth of the lowest frequency range.

17. The apparatus of claim 16, wherein the frequency range dividing means divides the digital input signal in frequency into a frequency range signal in each of plural frequency ranges, the bandwidth of the frequency ranges increasing with increasing frequency.

18. The apparatus of claim 16, wherein the block dividing means divides the frequency range signals in the frequency ranges above the lowest frequency range into blocks having a maximum block length, the maximum block length being invariable between the compression modes.

19. The apparatus of claim 11 or 15, wherein the apparatus is additionally for deriving an additional compressed digital signal, the additional compressed digital signal having a lower bit rate than the compressed digital signal, and wherein:

the apparatus additionally comprises inverse orthogonal transform means for inversely orthogonally transforming the spectral coefficients obtained by orthogonally transforming one of the frequency range signals to provide a restored frequency range signal;

additional block dividing means for dividing the restored frequency range signal in time into blocks, each block having a block length, the block lengths of the blocks having a maximum block length greater than the maximum block length whereinto the block dividing means divided the frequency range signal; and additional orthogonal transform means for orthogonally transforming each block of the restored frequency range signal from the additional block dividing means.

20. The apparatus of claim 11, wherein the frequency range dividing means comprises:

a low-pass filter having a cut-off frequency set according to the selected one of the plural compression modes, the low-pass filter receiving the digital input signal, and providing a frequency-limited signal, the cut-off frequency of the low-pass filter being set to a higher frequency in the first compression mode than in the second compression mode; and means for dividing the frequency-limited signal by frequency to provide the frequency range signal in each of the plural frequency ranges.

21. The apparatus of claim 20, wherein:

the quantizer includes adaptive bit allocating means for allocating quantizing bits among the bands, the adaptive bit allocating means allocating no quantizing bits to bands at frequencies substantially higher than the cut-off frequency of the low-pass filter; and the including means includes in the compressed digital signal no sub information for bands at frequencies substantially higher than the cut-off frequency of the low-pass filter.

22. The apparatus of claim 10, wherein the orthogonal transform circuit includes means for performing a modified discrete cosine transform.

23. A method for compressing a digital input signal in a selected one of plural compression modes to provide a compressed digital signal, the plural compression modes including a first compression mode and a second compression mode, the compressed digital signal having a higher bit rate in the first compression mode than in the second compression mode, the method comprising the steps of:

deriving from the digital input signal spectral coefficients grouped by frequency and by time into bands, each band having a frequency width, the frequency width of at least one of the bands being set according to the selected one of the compression modes;

quantizing the spectral coefficients in each band to provide quantized spectral coefficients; and including the quantized spectral coefficients in each band in the compressed digital signal, together with sub information for each band.

24. The method of claim 23, wherein, in the step of deriving spectral coefficients, the frequency width of the at least one band is set to a first frequency width in the first compression mode and is set to a second frequency width in the second compression mode, the second frequency width being greater than the first frequency width.

25. The method of claim 24, wherein the second frequency width is an integral number of times greater than the first frequency width.

26. The method of claims 24 or 25, wherein:

the digital input signal is a digital audio signal; and in the step of deriving spectral coefficients, selected ones of the spectral coefficients are grouped by frequency into bands for determining quantizing noise and masking, and a majority of the bands have frequency widths set to be broader towards higher frequencies.

27. The method of claim 23, wherein:

the digital input signal is a digital audio signal; and in the step of deriving spectral coefficients, selected ones of the spectral coefficients are grouped by frequency into bands for determining quantizing noise and masking, and a majority of the bands have frequency widths set to be broader towards higher frequencies.

28. The method of claim 27, wherein the step of deriving spectral coefficients includes the step of receiving the digital input signal at a fixed sampling frequency, the sampling frequency being invariable between the compression modes.

29. The method of claims 23 or 27, wherein the step of deriving spectral coefficients includes the steps of:

providing a low-pass filter having a cut-off frequency;

setting the cut-off frequency of the low-pass filter according to the selected one of the plural compression modes, the cut-off frequency being set to a higher frequency in the first compression mode than in the second compression mode;

filtering the digital input signal using the low-pass filter to provide a frequency-limited signal; and deriving the spectral coefficients from the frequency-limited signal.

30. The method of claim 29, wherein the step of deriving spectral coefficients additionally includes the step of receiving the digital input signal a fixed sampling frequency, the sampling frequency being invariable between the compression modes.

31. The method of claim 29, wherein:

the step of quantizing the spectral coefficients includes the step of adaptively allocating quantizing bits among the bands, the quantizing bits being allocated such that no quantizing bits are allocated to bands at frequencies substantially higher than the cut-off frequency of the low-pass filter; and in the step of including the quantized spectral coefficients and sub information in the compressed digital signal, no sub information is included in the compressed digital signal for bands at frequencies substantially higher than the cut-off frequency of the low-pass filter.

32. The method of claim 23, wherein the step of deriving spectral coefficients includes the steps of:

dividing the digital input signal in time into blocks;

orthogonally transforming each block of the digital input signal to provide a set of spectral coefficients; and grouping the spectral coefficients in the set of spectral coefficients by frequency into the bands.

33. The method of claim 23, wherein the step of deriving spectral coefficients from the digital input signal includes the steps of:

dividing the digital input signal in frequency into a frequency range signal in each of plural frequency ranges;

dividing each frequency range signal in time into blocks;

orthogonally transforming blocks of the frequency range signals to provide the set of spectral coefficients; and grouping the spectral coefficients in the set of spectral coefficients by frequency into the bands.

34. The method of claim 33, wherein, in the step of dividing the digital input signal in frequency, each of the frequency ranges has a bandwidth, and the digital input signal is divided into frequency range signals in frequency ranges including a lowest frequency range and a next-lowest frequency range, the next-lowest frequency range having a bandwidth equal to the bandwidth of the lowest frequency range.

35. The method of claim 33, wherein, in the step of dividing the digital input signal in frequency into frequency range signals in plural frequency ranges, the frequency ranges include a lowest frequency range, each of the frequency ranges has a bandwidth, and the bandwidth of the frequency ranges increase with increasing frequency.

36. The method of claims 33, 34, or 35, wherein, in the step of dividing each frequency range signal in time into blocks, the frequency range signal in each of the frequency ranges above the lowest frequency range is divided into blocks, each block having a maximum block length, the maximum block lengths of the blocks being invariable between the compression modes.

37. The method of claim 33, wherein, in the step of dividing each frequency range signal into blocks, each block has a block length, the block lengths of the blocks have a maximum block length, and each frequency range signal is divided into blocks having a maximum block length depending on the selected one of the compression modes, the maximum block length being greater in the second compression mode than in the first compression mode.

38. The method of claim 37, in the step of dividing the digital input signal in frequency, each of the frequency ranges has a bandwidth, and the digital input signal is divided into frequency range signals in frequency ranges including a lowest frequency range and a next-lowest frequency range, the next-lowest frequency range having a bandwidth equal to the bandwidth of the lowest frequency range.

39. The method of claim 37, wherein the frequency range dividing means divides the digital input signal in frequency into a frequency range signal in each of plural frequency ranges, the bandwidth of the frequency ranges increasing with increasing frequency.

40. The method of claims 37, 38, or 39, wherein, in the step of dividing each frequency range signal in time into blocks, the frequency range signals in the frequency ranges above the lowest frequency range are divided into blocks having a maximum block length, the maximum block length being invariable between the compression modes.

41. The method of claims 33 or 37 wherein the method is additionally for deriving an additional compressed digital signal, the additional compressed digital signal having a lower bit rate than the compressed digital signal, and wherein the method additionally comprises the steps of:

inversely orthogonally transforming the spectral coefficients provided orthogonally transforming one of the frequency range signals to provide a restored frequency range signal, dividing the restored frequency range signal in time into blocks, each block having a block length, the block lengths of the blocks having a maximum block length greater than the maximum block length whereinto the step of dividing each frequency range signal into block divided the frequency range signal; and orthogonally transforming each block of the restored frequency range signal from the additional block dividing means.

42. The method of claim 33, wherein the step of dividing the digital input signal in frequency includes the steps of:

providing a low-pass filter having a cut-off frequency;

setting the cut-off frequency of the low-pass filter according to the selected one of the plural compression modes, the cut-off frequency of the low-pass filter being set to a higher frequency in the first compression mode than in the second compression mode;

filtering the digital input signal using the low-pass filter to provide a frequency-limited signal; and dividing the frequency-limited signal in frequency to provide the frequency range signal in each of the frequency ranges.

43. The method of claim 42, wherein:

the step of quantizing the spectral coefficients includes the step of adaptively allocating quantizing bits among the bands, the quantizing bits being allocated among the bands such that no quantizing bits are allocated to bands at frequencies substantially higher than the cut-off frequency of the low-pass filter; and in the step of including the quantized spectral coefficient in the digital output signal, no sub information for bands at frequencies substantially higher than the cut-off frequency of the low-pass filter is included in the compressed digital signal.

44. The method of claims 23, 27, 33, or 42, additionally comprising the step of recording the compressed digital signal on a recording medium.

45. The method of claim 44, wherein, in the step of recording the compressed digital signal on a recording medium, compressed digital signal is recorded on a magneto-optical disc.

46. The method of claim 44, wherein, in the step of recording the compressed digital signal on a recording medium, compressed digital signal is recorded on a semiconductor recording medium.

47. The method of claim 44, wherein, in the step of recording the compressed digital signal on a recording medium, compressed digital signal is recorded on an IC memory card.

48. The method of claim 44, wherein, in the step of recording the compressed digital signal on a recording medium, compressed digital signal is recorded on an optical disc.

49. The method of claim 33, wherein, in the step of orthogonally transforming the digital input signal, the digital input signal is orthogonally transformed using a modified discrete cosine transform.

50. A digital signal processing system for compressing a digital input signal to provide a compressed digital signal and for expanding the compressed digital signal to provide a digital output signal, the system operating in a selected one of at least two different compression modes, including a first compression mode and a second compression mode, the compressed digital signal having a higher bit rate in the first compression mode than in the second compression mode, the system comprising:

a compressor, including:
compressed signal deriving means for analyzing the digital input signal into plural spectral coefficients grouped by frequency into plural bands, each band having a frequency width, for quantizing the spectral coefficients in each band to provide quantized spectral coefficients, and for providing the quantized spectral coefficients as the compressed digital signal, and means for setting the frequency width of at least one of the bands whereinto the spectral coefficients are grouped by frequency, the frequency width being set according to the selected compression mode; and an expander, including:
demultiplexing means for receiving the compressed digital signal and extracting the quantized spectral coefficients and the sub information therefrom, dequantizing means for dequantizing the quantized spectral coefficients in each band using the sub information for the band to provide spectral coefficients, the frequency width of at least one of the bands being set according to the selected compression mode, and output signal deriving means for deriving the digital output signal from the spectral coefficients.

51. The system of claim 50, wherein, in the compressor:

the digital input signal is a digital audio signal; and the compressed signal deriving means groups selected ones of the spectral coefficients by frequency into bands for determining quantizing noise and masking, a majority of the bands having frequency widths set to be broader towards higher frequencies.

52. The system of claim 50, wherein:

in the compressor, the compressed signal deriving means includes:
block dividing means for diving the digital input signal in time into blocks, an orthogonal transform circuit, the orthogonal transform circuit receiving each block of the digital input signal from the block dividing means, and providing a set of spectral coefficients in response to each block, grouping means for grouping each set of spectral coefficients from the orthogonal transform circuit by frequency into the bands; and in the expander, the output signal deriving means includes an inverse orthogonal transform circuit, the inverse orthogonal transform circuit receiving the spectral coefficients from the dequantizing means and providing blocks of the digital output signal.

53. The apparatus of claim 52, wherein:

the compressor additionally includes frequency range dividing means for dividing the digital input signal in frequency into a frequency range signal in each of plural frequency ranges;

in the compressor:
the block dividing means is for dividing each frequency range signal in time into blocks, and
the orthogonal transform circuit includes means for orthogonally transforming each block of each frequency range signal to provide the spectral coefficients; and in the expander:
the dequantizing means includes means for dividing the spectral coefficients by frequency into frequency ranges corresponding to the frequency ranges whereinto the frequency range dividing means divides the digital input signal,
the inverse orthogonal transform circuit includes means for inversely orthogonally transforming the spectral coefficients in each frequency range to provide blocks of a restored frequency range signal, and
the output signal deriving means additionally comprises means for synthesizing the blocks of the restored frequency range signals to provide the blocks of the digital output signal.

54. The apparatus of claim 53, wherein, in the compressor, the block dividing means divides each frequency range signal into blocks, each block having a block length, the block lengths of the blocks having a maximum block length depending on the selected one of the compression modes, the maximum block length being greater in the second compression mode than in the first compression mode.

55. The apparatus of claim 53, wherein, in the compressor the frequency range dividing means comprises:

a low-pass filter having a cut-off frequency set according to the selected one of the plural compression modes, the low-pass filter receiving the digital input signal, and providing a frequency-limited signal, the cut-off frequency of the low-pass filter being set to a higher frequency in the first compression mode than in the second compression mode; and means for dividing the frequency-limited signal by frequency to provide the frequency range signal in each of the plural frequency ranges.

56. Method for deriving a second compressed digital signal from a first compressed digital signal obtained by compressing a digital input signal in a first compression mode, the second compressed digital signal being compressed in a second compression mode, the first compressed digital signal and the second compressed digital signal respectively having a first bit rate and a second bit rate, the second bit rate being less than the second bit rate, the first compressed digital signal including plural quantized spectral coefficients grouped by frequency into bands, the bands being grouped by frequency into frequency ranges, the frequency ranges including a lowest-frequency frequency range, the method comprising the steps of:

extracting the quantized spectral coefficients from the first compressed digital signal;

inversely quantizing the quantized spectral coefficients to provide recovered spectral coefficients;

inversely orthogonally transforming the recovered spectral coefficients in the lowest-frequency frequency range to provide a block of a lowest-frequency frequency range signal;

joining blocks of the lowest-frequency frequency range signal together to provide super blocks;

orthogonally transforming the super blocks of the lowest-frequency frequency range signal to provide new spectral coefficients;

re-quantizing the new spectral coefficients and the recovered spectral coefficients not inversely orthogonally transformed in the inverse orthogonal transform step to provide new quantized spectral coefficients; and including the new quantized spectral coefficients in the second compressed digital signal.

57. The method of claim 56, wherein:

the frequency ranges additionally include a higher-frequency frequency range;

the method additionally comprises the steps of:
inversely orthogonally transforming the recovered spectral coefficients in a higher-frequency frequency range to provide a block of a higher-frequency frequency range signal,
downsampling the higher-frequency frequency range signal to provide a downsampled frequency range signal, and
orthogonally transforming the downsampled frequency range signal to provide additional new spectral coefficients; and in the step of quantizing the new spectral coefficients and the recovered spectral coefficients not inversely orthogonally transformed in the inverse orthogonal transform step, the additional new spectral coefficients are also quantized to provide new quantized spectral coefficients.

58. The method of claim 57, wherein, in the step of downsampling the higher-frequency frequency range signal, the higher-frequency frequency range signal is downsampled by a factor of at least two.

59. The method of claim 56, additionally comprising the step of reproducing the first compressed signal from a recording medium.

* * * * *